United States Patent [19]
Hirayama et al.

[11] Patent Number: 5,835,670
[45] Date of Patent: *Nov. 10, 1998

[54] MULTILINGUAL RECORDING MEDIUM AND REPRODUCTION APPARATUS

[75] Inventors: Koichi Hirayama, Kawasaki; Masatoshi Nakai, Kamakura; Yuichi Miyano, Tokyo, all of Japan

[73] Assignee: Kabushiki Kaisha Toshiba, Kawasaki, Japan

[*] Notice: The term of this patent shall not extend beyond the expiration date of Pat. No. 5,652,824.

[21] Appl. No.: 863,001

[22] Filed: May 23, 1997

Related U.S. Application Data

[63] Continuation of Ser. No. 464,876, Jun. 28, 1995, Pat. No. 5,652,824.

[51] Int. Cl.⁶ .............. H04N 5/91; H04N 5/428; H04N 7/04; H04N 7/06
[52] U.S. Cl. .............. 386/97; 386/125; 386/39; 386/96; 360/48
[58] Field of Search .............. 386/39, 45, 46–99, 386/124–126; 348/342; 360/32, 48, 20

[56] References Cited

U.S. PATENT DOCUMENTS

| | | |
|---|---|---|
| 4,305,131 | 12/1981 | Best . |
| 4,317,131 | 2/1982 | Jerome . |
| 4,333,152 | 6/1982 | Best . |

(List continued on next page.)

FOREIGN PATENT DOCUMENTS

| | | |
|---|---|---|
| 205944 | 12/1986 | European Pat. Off. . |
| 245904 | 11/1987 | European Pat. Off. . |
| 325325 | 7/1989 | European Pat. Off. . |

(List continued on next page.)

OTHER PUBLICATIONS

Patent Abstracts of Japan; Publication No.: 4–245091; Publication Date: Sep. 01, 1992.
Patent Abstracts of Japan; Publication No.: 5–151276; Publication Date: Jun. 18, 1993.
Patent Abstracts of Japan; Publication No.: 7282540; Publication Date: Oct. 27, 1995.
Patent Abstracts of Japan; Publication No.: 7284060; Publication Date: Oct. 27, 1995.
Patent Abstracts of Japan; Publication No.: 6028780; Publication Date: Feb. 04, 1994.

*Primary Examiner*—Tommy P. Chin
*Assistant Examiner*—David R. Vincent
*Attorney, Agent, or Firm*—Cushman Darby & Cushman IP Group of Pillsbury Madison & Sutro LLP

[57] ABSTRACT

A reproduction apparatus is designed to select and decode speech and subtitles (characters) in a given language from a disk on which various types of information are recorded in different languages. This system arrangement makes it possible to standardize the manufacture of disks and reproduction apparatuses world-wide, resulting in a reduction in production cost. In a disk 100, various types of information are recorded in different languages along with video information. A reproduction apparatus selects information in a given language from the reproduced information using a data string processing section 203, a system control section 204, and an operator section 205, and supplies is the selected pieces of information to each of a video processing section 206, a subtitle decoder 211, and an audio processing section 213.

37 Claims, 18 Drawing Sheets

U.S. PATENT DOCUMENTS

| | | |
|---|---|---|
| 4,353,090 | 10/1982 | Broadbent . |
| 4,433,347 | 2/1984 | Sugiyama et al. . |
| 4,490,752 | 12/1984 | Machida et al. . |
| 4,510,531 | 4/1985 | Sugiyama . |
| 4,519,008 | 5/1985 | Takenouchi et al. . |
| 4,542,419 | 9/1985 | Morio et al. . |
| 4,551,771 | 11/1985 | Machida et al. . |
| 4,563,709 | 1/1986 | Hirata . |
| 4,569,026 | 2/1986 | Best . |
| 4,583,132 | 4/1986 | Nakano et al. . |
| 4,602,295 | 7/1986 | Moriyama et al. . |
| 4,604,655 | 8/1986 | Moriyama . |
| 4,613,908 | 9/1986 | Takahashi et al. . |
| 4,614,979 | 9/1986 | Sugiyama et al. . |
| 4,614,982 | 9/1986 | Ibaraki . |
| 4,641,204 | 2/1987 | Sugiyama . |
| 4,642,703 | 2/1987 | Endo . |
| 4,647,985 | 3/1987 | Yokosawa . |
| 4,656,528 | 4/1987 | Shichijo et al. . |
| 4,660,099 | 4/1987 | Sugiyama et al. . |
| 4,669,070 | 5/1987 | Bell . |
| 4,680,647 | 7/1987 | Moriyama . |
| 4,685,098 | 8/1987 | Yoshida . |
| 4,703,369 | 10/1987 | Moriyama et al. . |
| 4,707,818 | 11/1987 | Suzuki . |
| 4,709,277 | 11/1987 | Ninomiya et al. . |
| 4,736,258 | 4/1988 | Noble et al. . |
| 4,752,832 | 6/1988 | Higurashi . |
| 4,752,835 | 6/1988 | Sou . |
| 4,763,207 | 8/1988 | Podolak . |
| 4,768,104 | 8/1988 | Kanamaru . |
| 4,768,106 | 8/1988 | Ito et al. . |
| 4,774,596 | 9/1988 | Hashimoto . |
| 4,779,252 | 10/1988 | Custers . |
| 4,792,861 | 12/1988 | Kawase et al. . |
| 4,800,446 | 1/1989 | Kanamaru . |
| 4,802,018 | 1/1989 | Tanikawa et al. . |
| 4,814,897 | 3/1989 | Kojima et al. . |
| 4,849,827 | 7/1989 | Hashimoto et al. . |
| 4,849,828 | 7/1989 | Yasuda et al. . |
| 4,858,024 | 8/1989 | Kanamaru . |
| 4,868,678 | 9/1989 | Kawase et al. . |
| 4,872,068 | 10/1989 | Ishii et al. . |
| 4,893,193 | 1/1990 | Nakamura et al. . |
| 4,905,077 | 2/1990 | Ishii . |
| 4,914,523 | 4/1990 | Maruta . |
| 4,916,553 | 4/1990 | Yoshioka et al. . |
| 4,916,683 | 4/1990 | Mizokami et al. . |
| 4,920,424 | 4/1990 | Hosaka et al. . |
| 4,930,158 | 5/1990 | Vogel . |
| 4,947,265 | 8/1990 | Hayashi et al. . |
| 4,951,155 | 8/1990 | Andrews . |
| 4,956,725 | 9/1990 | Kozuki et al. . |
| 4,970,602 | 11/1990 | Yoshio . |
| 4,992,886 | 2/1991 | Klappert . |
| 5,040,067 | 8/1991 | Yamazaki . |
| 5,043,826 | 8/1991 | Yoshio et al. . |
| 5,063,551 | 11/1991 | Yoshio et al. . |
| 5,065,252 | 11/1991 | Yoshio et al. . |
| 5,089,899 | 2/1992 | Nomura et al. . |
| 5,097,349 | 3/1992 | Nomura et al. . |
| 5,107,343 | 4/1992 | Kawai . |
| 5,122,886 | 6/1992 | Tanaka . |
| 5,126,851 | 6/1992 | Yoshimura et al. . |
| 5,130,816 | 7/1992 | Yoshio . |
| 5,132,807 | 7/1992 | Takimoto et al. . |
| 5,136,394 | 8/1992 | Haikawa et al. . |
| 5,161,034 | 11/1992 | Klappert . |
| 5,175,631 | 12/1992 | Juri et al. . |
| 5,177,645 | 1/1993 | Lemelson . |
| 5,191,436 | 3/1993 | Yonemitsu . |
| 5,218,454 | 6/1993 | Nagawasa . |
| 5,221,965 | 6/1993 | Okino . |
| 5,224,087 | 6/1993 | Maeda . |
| 5,233,438 | 8/1993 | Funahashi et al. . |
| 5,241,399 | 8/1993 | Kanamaru . |
| 5,243,582 | 9/1993 | Yamauchi . |
| 5,243,588 | 9/1993 | Maeda . |
| 5,245,600 | 9/1993 | Yamauchi . |
| 5,249,166 | 9/1993 | Hamilton . |
| 5,253,120 | 10/1993 | Endoh . |
| 5,257,253 | 10/1993 | Otsubo et al. . |
| 5,270,828 | 12/1993 | Mogi . |
| 5,280,572 | 1/1994 | Case . |
| 5,282,049 | 1/1994 | Hatakenaka et al. . |
| 5,282,186 | 1/1994 | Yoshio et al. . |
| 5,287,226 | 2/1994 | Sato et al. . |
| 5,289,288 | 2/1994 | Silverman et al. . |
| 5,294,997 | 3/1994 | Ogura et al. . |
| 5,295,024 | 3/1994 | Adachi . |
| 5,315,400 | 5/1994 | Kurata et al. . |
| 5,315,570 | 5/1994 | Mura et al. . |
| 5,327,406 | 7/1994 | Sako . |
| 5,336,844 | 8/1994 | Yamauchi . |
| 5,355,229 | 10/1994 | Arano . |
| 5,365,502 | 11/1994 | Misono . |
| 5,371,602 | 12/1994 | Tsuboi et al. . |
| 5,396,374 | 3/1995 | Kubota . |
| 5,400,077 | 3/1995 | Cookson . |
| 5,400,305 | 3/1995 | Sadanaka . |
| 5,400,315 | 3/1995 | Koishi et al. . |
| 5,400,433 | 3/1995 | Davis . |
| 5,406,381 | 4/1995 | Han . |
| 5,410,676 | 4/1995 | Huang et al. . |
| 5,412,514 | 5/1995 | Kobayashi . |
| 5,414,455 | 5/1995 | Hooper . |
| 5,420,690 | 5/1995 | Koishi . |
| 5,420,839 | 5/1995 | Tateishi . |
| 5,424,850 | 6/1995 | Inoue et al. . |
| 5,434,678 | 7/1995 | Abecassis . |
| 5,434,829 | 7/1995 | Maeda et al. . |
| 5,440,529 | 8/1995 | Takezawa et al. . |
| 5,442,456 | 8/1995 | Hansen . |
| 5,448,368 | 9/1995 | Rijckaert . |
| 5,455,684 | 10/1995 | Fujinami . |
| 5,497,241 | 3/1996 | Ostrover et al. . |
| 5,506,370 | 4/1996 | Nakai et al. . |
| 5,508,816 | 4/1996 | Ueda . |
| 5,513,010 | 4/1996 | Kori . |
| 5,521,900 | 5/1996 | Ando . |
| 5,535,008 | 7/1996 | Yamagishi . |
| 5,541,737 | 7/1996 | Oguro . |
| 5,543,925 | 8/1996 | Timmermans . |
| 5,546,368 | 8/1996 | Lee . |
| 5,561,649 | 10/1996 | Lee . |
| 5,576,843 | 11/1996 | Cookson et al. . |
| 5,587,979 | 12/1996 | Bluthgen . |
| 5,596,564 | 1/1997 | Fukushima et al. . |
| 5,617,407 | 4/1997 | Bareis . |
| 5,619,338 | 4/1997 | Nakai et al. . |
| 5,630,006 | 5/1997 | Hirayama et al. . |
| 5,646,931 | 7/1997 | Terasaki . |
| 5,652,824 | 7/1997 | Hirayama et al. . |
| 5,655,052 | 8/1997 | Nakai et al. . |

FOREIGN PATENT DOCUMENTS

| | | |
|---|---|---|
| 381807 | 8/1990 | European Pat. Off. . |
| 0 410 579 | 1/1991 | European Pat. Off. . |
| 0 440 408 | 8/1991 | European Pat. Off. . |
| 459157 | 12/1991 | European Pat. Off. . |
| 521487 | 1/1993 | European Pat. Off. . |
| 0 528 421 A2 | 2/1993 | European Pat. Off. . |

| | | | | | | |
|---|---|---|---|---|---|---|
| 0 542 377 | 5/1993 | European Pat. Off. . | | 461051 | 2/1992 | Japan . |
| 540164 | 5/1993 | European Pat. Off. . | | 4245091 | 9/1992 | Japan . |
| 664646 | 7/1995 | European Pat. Off. . | | 4-307884 | 10/1992 | Japan . |
| 675493 | 10/1995 | European Pat. Off. . | | 4-332969 | 11/1992 | Japan . |
| 677842 | 10/1995 | European Pat. Off. . | | 4324165 | 11/1992 | Japan . |
| 685845 | 12/1995 | European Pat. Off. . | | 5-12804 | 1/1993 | Japan . |
| 9392366 | 3/1996 | European Pat. Off. . | | 5-12831 | 1/1993 | Japan . |
| 93923666 | 3/1996 | European Pat. Off. . | | 5151276 | 6/1993 | Japan . |
| 93923665 | 8/1996 | European Pat. Off. . | | 5-176290 | 7/1993 | Japan . |
| 63-43480 | 2/1988 | Japan . | | 5-189872 | 7/1993 | Japan . |
| 63-58690 | 3/1988 | Japan . | | 5-342748 | 12/1993 | Japan . |
| 63-275071 | 11/1988 | Japan . | | 628780 | 2/1994 | Japan . |
| 1-32589 | 2/1989 | Japan . | | 6-189218 | 7/1994 | Japan . |
| 1-221072 | 9/1989 | Japan . | | 6-309841 | 11/1994 | Japan . |
| 1-241083 | 9/1989 | Japan . | | 7-130102 | 5/1995 | Japan . |
| 1-273275 | 11/1989 | Japan . | | 7-134892 | 5/1995 | Japan . |
| 1-314080 | 12/1989 | Japan . | | 7-141844 | 6/1995 | Japan . |
| 2-202766 | 8/1990 | Japan . | | 7-168855 | 7/1995 | Japan . |
| 2-276071 | 11/1990 | Japan . | | 7-176175 | 7/1995 | Japan . |
| 2-287990 | 11/1990 | Japan . | | 7282540 | 10/1995 | Japan . |
| 3-134883 | 6/1991 | Japan . | | 7284060 | 10/1995 | Japan . |
| 3-207056 | 9/1991 | Japan . | | 2157122 | 10/1985 | United Kingdom . |
| 3-220671 | 9/1991 | Japan . | | 2 260 463 | 4/1993 | United Kingdom . |
| 3-250463 | 11/1991 | Japan . | | WO 83/02839 | 8/1983 | WIPO . |
| 3-293873 | 12/1991 | Japan . | | WO 92/05658 | 4/1992 | WIPO . |
| 4-13287 | 1/1992 | Japan . | | WO 94/07332 | 3/1994 | WIPO . |
| 4-28056 | 1/1992 | Japan . | | WO 94/30014 | 12/1995 | WIPO . |
| 4-40770 | 2/1992 | Japan . | | | | |

MOVIE

| DATA STRING | |
|---|---|
| 0 | B&M |
| 1 | D1+B&M |
| 2 | D2 |
| 3 | D3 |
| ... | ... |
| 7 | D7 |

FIG. 2A

KARA-OK

| DATA STRING | KARA-OK |
|---|---|
| 0 | |
| 1 | D1 |
| 2 | D2 |
| 3 | D3 |
| ... | ... |
| 7 | D7 |

FIG. 2B

KARA-OK

| DATA STRING | KARA-OK |
|---|---|
| 0 | |
| 1 | GUIDE VOCAL |
| 2 | MELODY LINE |
| 3 | DUET (L,R) |
| ... | ... |
| 7 | |

FIG. 2C

KARA-OK (MINUS 1)

| DATA STRING | KARA-OK |
|---|---|
| 0 | |
| 1 | -SOLO |
| 2 | -SOLO1/SOLO2 (L,R) |
| 3 | |
| ... | ... |
| 7 | |

FIG. 2D

| DATA STRING | FULL ORCHESTRA |
|---|---|
| 0 | |
| 1 | -INSTRUMENT 1 |
| 2 | -INSTRUMENT 2 |
| 3 | |
| ... | ... |
| 7 | -INSTRUMENT 7 |

FIG. 2E

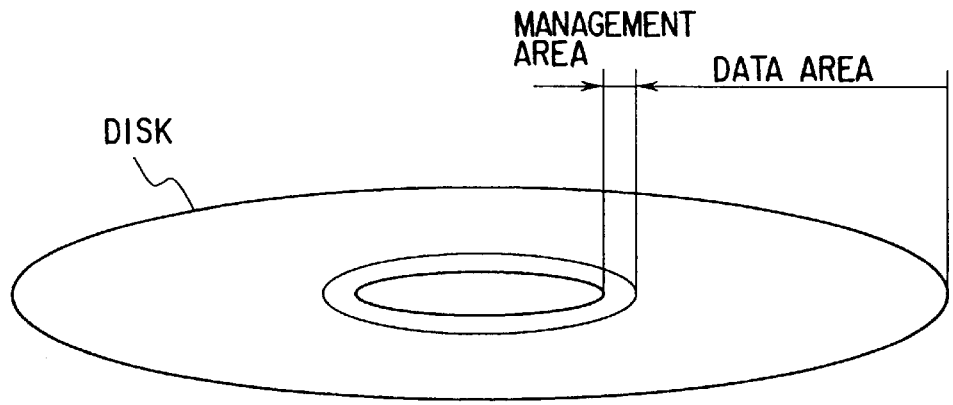
F I G. 3A
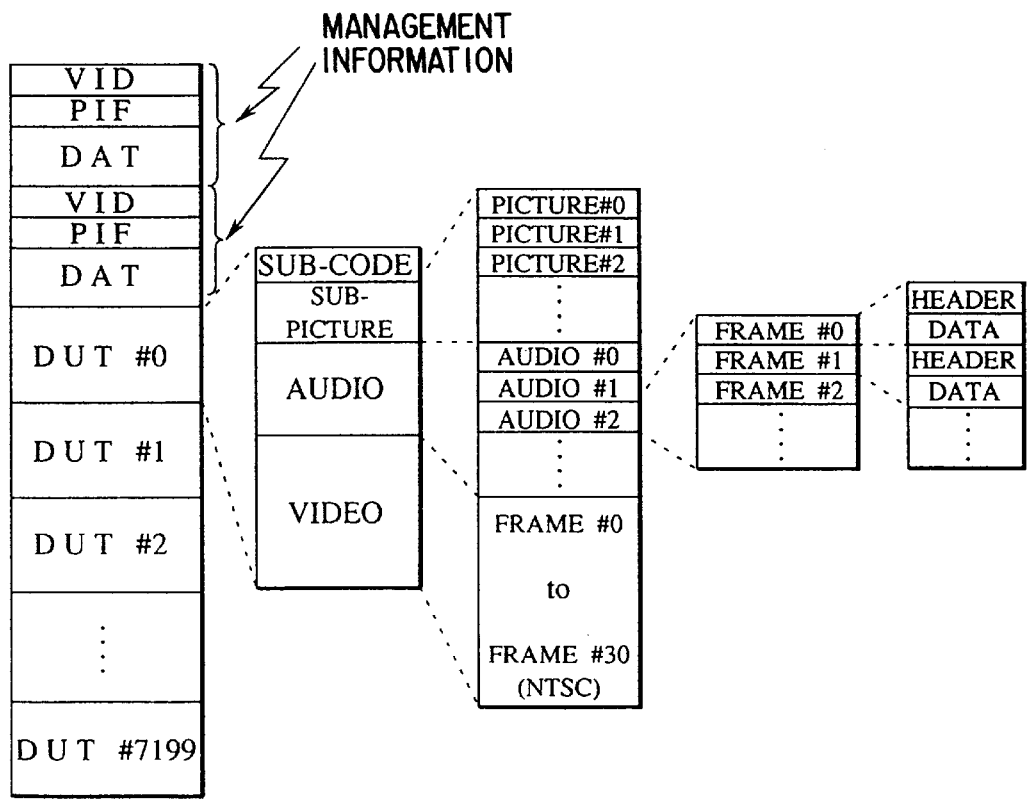
F I G. 3B

TABLE: CONTENT CODES IN
(VID) AND LANGUAGE CODES

| CONTENT CODE | LANGUAGE CODE |
|---|---|
| 0 | NON-LINGUISTIC |
| 1 | ENGLISH |
| 2 | JAPANESE |
| 3 | FRENCH |
| 4 | GERMAN |
| ⋮ | ⋮ |

FIG. 4A

TABLE: DATA-STRING NUMBERS AND CONTENT CODES

| DATA-STRING NUMBER | CONTENT CODE |
|---|---|
| # 0 | 1(D1+B&M) |
| # 1 | 3(D3) |
| # 2 | 2(D2) |
| # 3 | 0(B&M) |
| ⋮ | ⋮ |

FIG. 4B

MEANINGS OF CONTENT CODES

| CONTENT CODE | MEANING |
|---|---|
| 0 | B&M |
| 1 | D1+B&M |
| 2 | D2 |
| 3 | D3 |
| ⋮ | ⋮ |
| 7 | D7 |

BACKGROUND SOUND AND MAIN SOUND

FIRST-LANGUAGE DIALOG
BACKGROUND SOUND AND MAIN SOUND

SECOND-LANGUAGE DIALOG

FIG. 4C

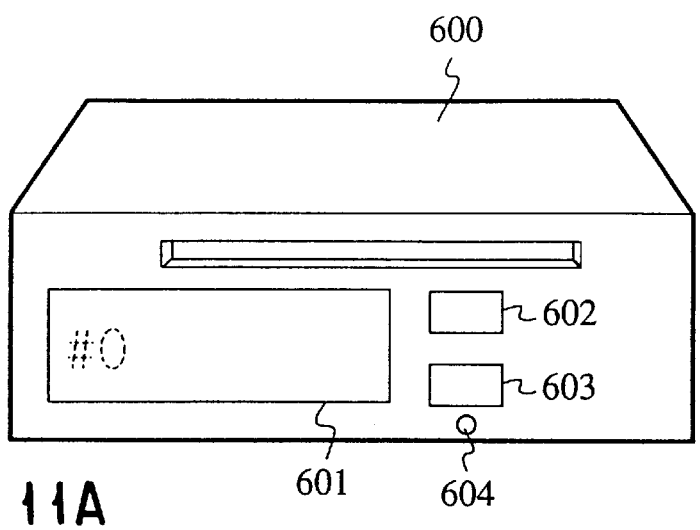
F I G. 11A
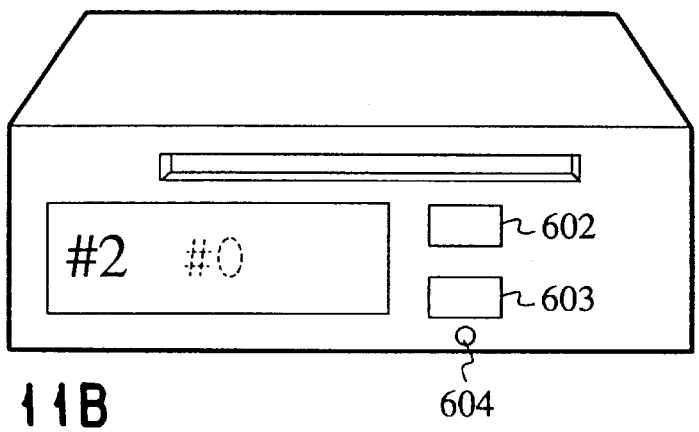
F I G. 11B
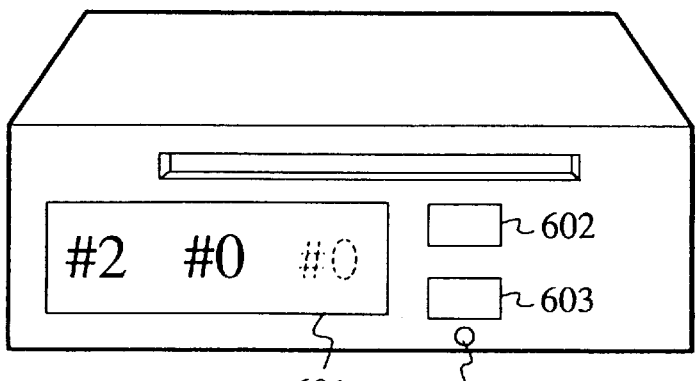
F I G. 11C

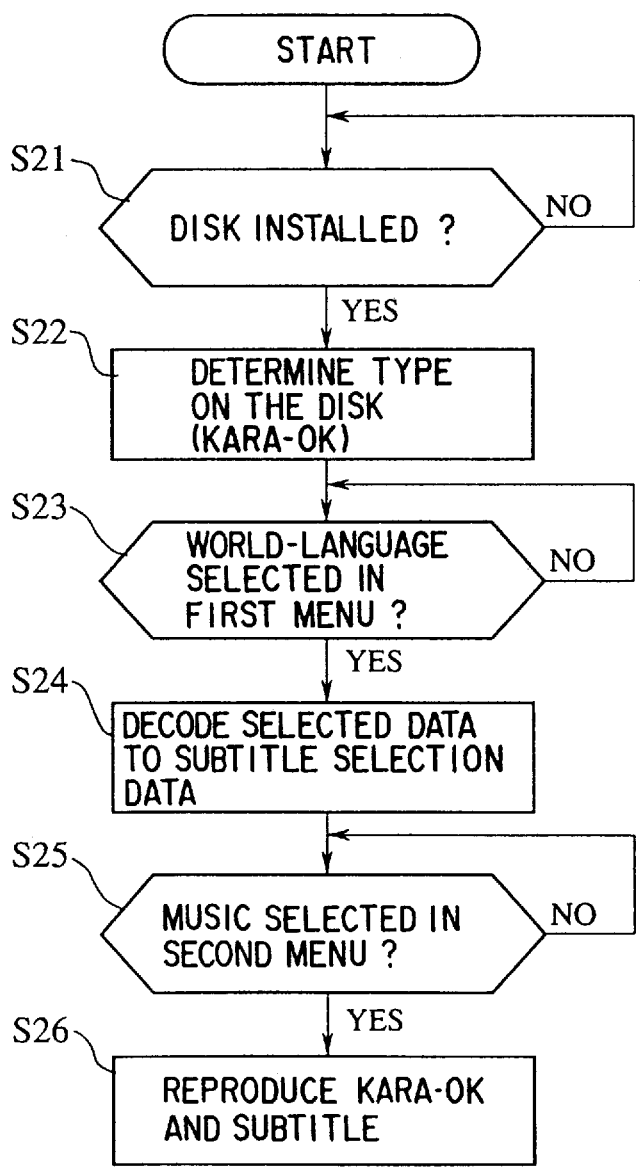
F I G. 13

```
#0   ENGLISH          ← DISPLAYED IN ENGLISH
#1   --------         ← DISPLAYED IN FRENCH
#2   日本語            ← DISPLAYED JAPANESE
#3   --------         ← KARA-OK
#4   --------
 ⋮
#7   --------
```

F I G. 15A

```
                    MUSIC
#0  --------   #20  --------   #30  --------
#1  --------   #21  --------   #31  --------
#2             #32             #32
 ⋮              ⋮                ⋮
```

F I G. 15B

```
#0   KARA-OK
#1   GUIDE VOCAL
#2   MELODY LINE
 ⋮
#7
```

F I G. 15C

| | |
|---|---|
| #0 | FULL ORCHESTRA |
| #1 | - INSTRUMENT I (PIANO) |
| #2 | - INSTRUMENT I (VIOLIN) |
| #3 | |
| #4 | |
| ⋮ | |
| #7 | |

F I G. 16A

| | |
|---|---|
| #0 | FULL ORCHESTRA |
| #1 | - SOLO |
| #2 | - SOLO1/SOLO2 (L,R) |
| ⋮ | |

F I G. 16B

| | |
|---|---|
| #0 | CHORUS |
| #1 | - TENOR |
| #2 | - ALTO |
| #3 | - BASS |
| #4 | |

F I G. 16C

| DATA-STRING NUMBER | SOUND |
|---|---|
| #0 | ENVIRONMENTAL SOUND |
| #1 | ENVIRONMENTAL SOUND+D1 |
| #2 | D2 |
| #3 | D3 |
| #4 | D1 (SUBSPEECH) |
| ⋮ | |
| #7 | |
F I G. 18A
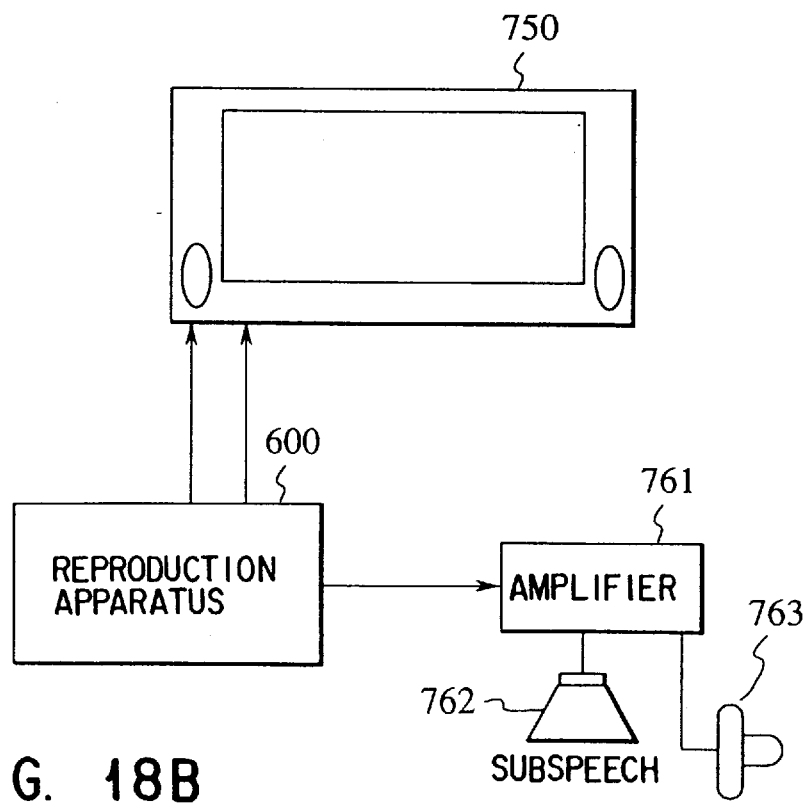
F I G. 18B

MULTILINGUAL RECORDING MEDIUM AND REPRODUCTION APPARATUS

This is a continuation of Ser. No. 464,876, filed Jun. 28, 1995, now U.S. Pat. No. 5,652,824.

TECHNICAL FIELD

This invention relates to a multilingual recording medium and a reproduction apparatus which can record information such as movie programs, Kara-OK programs, educational programs, and learning programs on a medium such as an optical disk, along with comments, subtitles, speeches and the like in various languages, such that any speech or subtitle (character data) is reproduced in the language selected.

BACKGROUND ART

Films produced in foreign countries are sometimes dubbed into the mother tongue or added with the native language subtitles before they are released. Bilingual TV broadcasting systems have been developed, in which the user can select the desired language at his or her TV set.

The user can select either of the two languages but cannot select any other language.

The market of systems using recording mediums (films, disks, magnetic tape, etc.) has expanded world-wide. Demand has therefore grown for systems capable of reproducing recorded information in more than one, or even two, languages.

SUMMARY OF THE INVENTION

Accordingly, an object of this invention is to provide a multilingual recording medium which serves as an information source and on which information is recorded in at least three languages, and also to provide a reproduction apparatus which reproduces the information from the medium.

Another object of the present invention is to provide a multilingual recording medium which serves as an information source on which information is recorded in at least three languages at an improved recording density for more effective use, and to provide a reproduction apparatus which reproduces the information from the medium.

Still another object of the invention is to provide a multilingual recording medium which facilitates the handling of an information source during reproduction and which serves as an information source containing information in at least three languages, and to provide a reproduction apparatus which reproduces the information from the medium.

Another object of the present invention is to provide a multilingual recording medium which has a management table for creating a menu screen that enables a user to acknowledge a plurality of languages when the medium contains information in at least three languages, and a reproduction apparatus which reproduces the information from the medium.

A further object of this invention is to provide a multilingual recording medium which enables an user to know easily the contents of the recorded information by providing the user with comments in each language when the medium used as an information source contains information in at least three languages, and a reproduction apparatus which reproduces the information from the medium.

Another object of the present invention is to provide a multilingual recording medium in which any combination of speech, subtitles, etc. can be achieved when the medium used as an information source contains information in at least three languages, and a reproduction apparatus which reproduces the information from the medium.

Still another object of the invention is to provide a recording medium from which information can be reproduced by erasing or adding any piece of various types of information recorded on the medium, and a reproduction apparatus which reproduces the information from the medium.

In a part of a disk according to the present invention, a management area is formed. A data area is formed in another portion of the disk. Control information indicating the data arrangement of the data area and types of languages is recorded in the management area. A plurality of data units are recorded in the data area. Each data unit contains video information, and pieces of audio information including at least three pieces of language information related to the video information. Each language information piece has an audio identification data.

A reproduction apparatus of the invention contains means for decoding the video information and reproducing any language information piece selected.

In a disk of the invention, the pieces of audio information are each formed of a plurality of frames. Each frame is basically composed of a header containing data time length information and data corresponding to the header. Data on silence is not recorded. The header is immediately followed by a next header.

A reproduction apparatus of the invention sets a silent period on the basis of the data indicating the time length of a header, when the header is immediately followed by another header.

In a portion of a disk of the invention, a management area is formed. A data area is formed in another portion of the disk. A plurality of data units are recorded in the data area. Each data unit contains frames of video information and pieces of audio information including at least three pieces of language information corresponding to the frames of video information. Each audio information piece has audio identification data. Audio information pieces and the video information pieces are arranged in the reading direction in the order mentioned. Control information is recorded in the management area along with data string identification information on each audio information piece recorded the control information indicating the data unit arrangement in the data area and types of languages.

A reproduction apparatus of the invention reads the audio information and the video information in the order mentioned. When the video information is read intermittently at high speed, parts of the audio information are sampled and decoded.

A disk of the present invention has a management area and a data area formed in two different portions. A plurality of data units are recorded in the data area. Each data unit contains video information, pieces of audio information, and subtitle information in at least three languages. The audio information pieces include music information related to the video information and at least three pieces of language information. The audio information pieces are recorded along with audio identification data. The subtitle information is related to the video information and is recorded along with subtitle identification data. Recorded on the management area are audio data string information on each of the pieces of audio information, subtitle data string information on each piece of the subtitle information in at least two languages, and the address of comment information in a language corresponding to each of the at least three pieces of language information, along with control information indicating the data arrangement of the data area and types of languages.

A reproduction apparatus of the invention has means for reading and storing the management data recorded in the management area, and means for generating a menu screen from the management data containing a display signal for each of the languages.

A disk of the present invention has a management area and a data area formed in two different portions. A plurality of data units are recorded in the data area. Each data unit contains video information, pieces of audio information, and subtitle information in at least two languages. The audio information pieces include music information related to the video information and at least three pieces of language information the audio information being recorded along with audio identification data. The subtitle information is related to the video information and is recorded along with subtitle identification data. Recorded in the management area, are audio data string information on each of the pieces of audio information, subtitle data string information on each piece of the subtitle information in at least two languages, and the address of comment information in the languages, along with control information indicating the data arrangement of the data area and types of languages.

A reproduction apparatus of the invention has means for controlling data strings of the video information, pieces of audio information, and subtitle information in at least two languages. The data string control means comprises two menu screen display means. The first menu screen display means relates a language select menu with a key display signal in accordance with the control information which indicates the kinds of languages stored in the management information storage means, the first menu screen display means also displays the language select menu on the video monitor in accordance with the user acknowledged display signal for each language. The second menu screen display means causes the video monitor to display the comment display signal for the language selected based on select information, corresponding to the key display signal entered from an operator panel.

A disk of the present invention has a management area and a data area formed in two different portions. A plurality of data units are recorded in the data area. Each data unit contains video information, pieces of audio information, and subtitle information in at least two languages. The audio information pieces includes music information related to the video information and at least three pieces of language information the audio information being recorded along with audio identification data. The subtitle information is related to the video information and recorded along with subtitle identification data. Recorded in the management area are audio data string information on each piece of the audio information, subtitle data string information on each of the subtitle information in at least two languages, and the address of comment information in the languages, along with control information indicating the data arrangement of the data area and types of languages.

A reproduction apparatus of the invention has means for controlling data strings of the video information, pieces of audio information, and subtitle information in at least two languages. The data string control means comprises a first menu screen display means as well as audio and subtitle information selecting means. The first menu screen display means relates a language select menu with a key display signal in accordance with the control information indicating the kinds of languages stored in the management information storage means the first menu screen display means also displays the language select menu on the video monitor in accordance with the user acknowledged display signal for each language. The audio and subtitle information selecting means automatically selects the audio information and subtitle information in the language selected by the select information, when the select information on the language corresponding to the key display signal is entered from an operator panel.

A disk of the present invention has a management area and a data area formed in two different portions. Control information indicating the data arrangement of the data area is recorded in the management area. A plurality of data units are recorded in the data area. Each data unit contains video information, first audio information obtained by combining words information and accompaniment information, and second audio information.

A disk may contain various types of information in different languages as mentioned above. From such a disk, the reproduction apparatus can select and decode speech and subtitles (letters or characters) in a given language. This makes it possible to standardize the processing of manufacturing disks and reproduction equipment leading to a reduction in production costs.

BREIF DESCRIPTION OF THE DRAWINGS

FIGS. 2A to 2E show examples of the contents recorded in a disk of the invention, respectively;

FIG. 3A illustrates an information area of the disk, and FIG. 3B shows the data format of the disk;

FIGS. 4A to 4C illustrate the information tables recorded in the management area of the disk;

FIGS. 11A to 11C are perspective views of another embodiment of the reproduction apparatus and explains the operation of this embodiment;

FIG. 13 is a flowchart explaining the operation of the reproduction apparatus, which corresponds to the menu screen in FIG. 12;

FIGS. 15A to 15C are other examples of the menu screens displayed by the reproduction apparatus of FIG. 1;

FIGS. 16A to 16C are still other examples of the menu screens displayed by in the reproduction apparatus of FIG. 1;

FIG. 18A shows another example of recording information on a disk of the invention, and FIG. 18B is a schematic diagram of its application.

BEST MODE OF CARRYING OUT THE INVENTION

Hereinafter, embodiments of the present invention will be described, with reference to the accompanying drawings.

Figure 1:
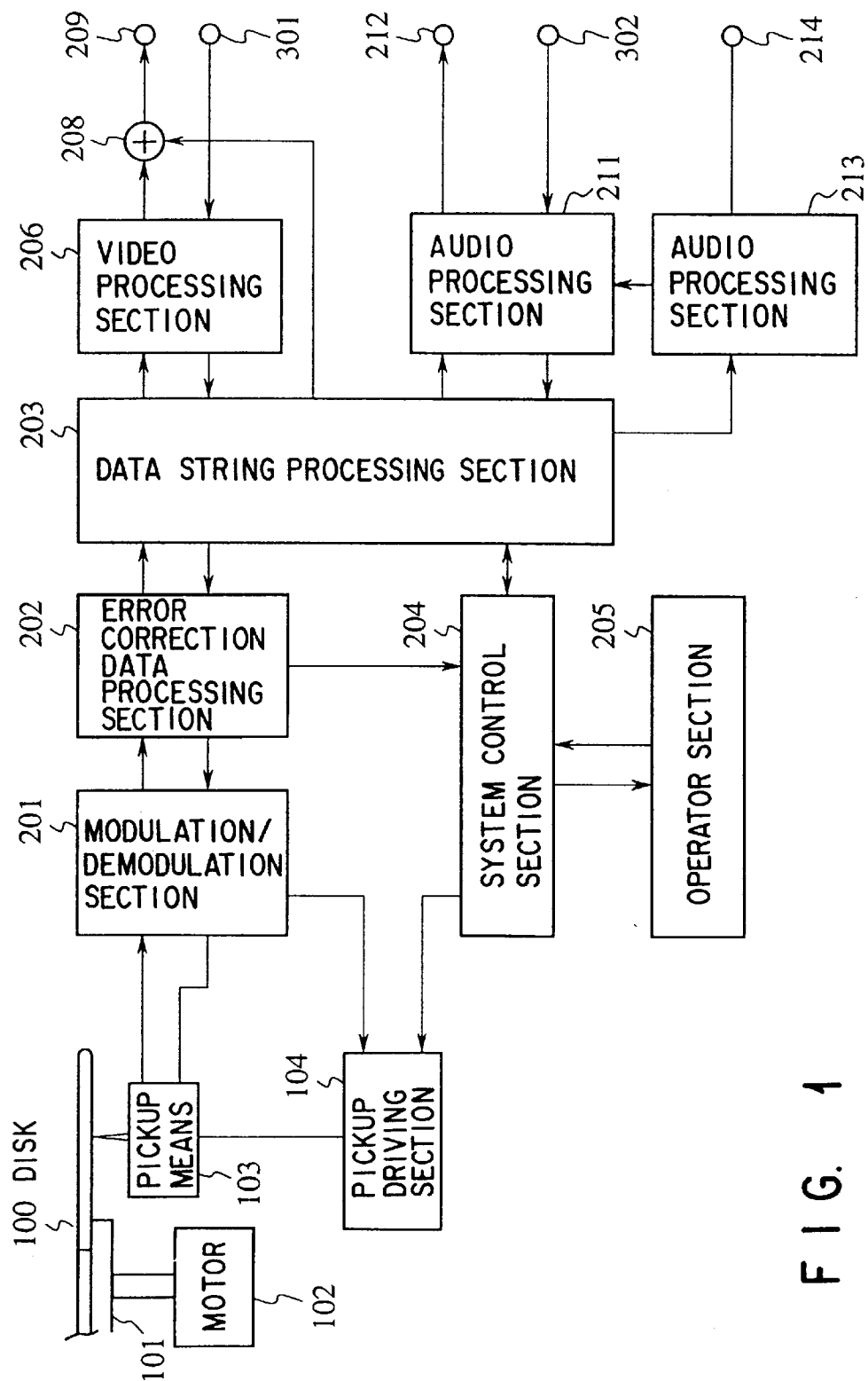
FIG. 1 is a block diagram of a multilingual reproduction apparatus according to an embodiment of this invention.

In FIG. 1, a recording medium such as an optical disk (hereinafter referred to as "disk") of the present invention 100 is installed in a recording and reproduction apparatus (accessing apparatus).

The disk 100 is placed on a turntable 101, which is rotated by a motor 102. In the reproducing mode, pickup means 103 reads the information recorded on the disk 100. A pickup driving section 104 controls the movement of the pickup means 103, thereby achieving tracking control. The output of the pickup means 103 is supplied to a modulation/demodulation section 201, which demodulates the supplied signal. The demodulated data is supplied to an error correction data processing section 202. The section 202 corrects errors and supplies the resulting signal to a data string processing section 203. The section 203 extracts video information, subtitle and character information, and audio information. On the disk 100, the subtitle and character information and audio information are recorded and related to the video information, as will be explained later. One of various languages can be selected for the subtitle and character information and audio information. The selection is made under the control of a system control section 204. A user operates an operator panel 204, inputting data to the system control section 204.

The video information is separated at the data string processing section 203 and supplied to a video processing section 206. The section 206 decodes the video information in accordance with the type of the display unit used. For example, the video information is converted into a suitable form for an NTSC, PAL, SECAM, or wide screen. The video signal decoded at the video processing section 206 is supplied to an adder 208. The adder 208 adds the decoded video signal with the subtitle and character information and supplies the addition result at an output terminal 209. The audio information separated at the data string processing section 203 is supplied to an audio processing section 211. The section 211 demodulates the audio information, producing a demodulated signal. The signal is output from an output terminal 212.

To function as a decoding section, the audio processing section, contains an audio processing section 213 in addition to section 211. It can also reproduce speech in another language and supply the result at an output terminal 214 (this function will be described later).

The apparatus can also record data. To record data, the video recording signal is supplied to an input terminal 301, and the audio recording signal is supplied to an input terminal 302. The video processing section 206 acts as a video encoder, while the audio processing section 211 serves as an audio encoder. The data string processing section 203 functions as a formatter for recording information. The error correction data processing section 202 acts as an error code adding section. After being processed by these circuits, the data is modulated at the modulation section of the modulation and demodulation section 201, and the modulated signal is sent as recording information to the pickup section 103.

As will be described later, language information on various languages, audio information including music information and background music information, and subtitle information in various languages are recorded on the disk 100 used relative to the video information. The audio data string processing section 203, system control section 204, and operator section 205 constitute data string control means. This control means determines which language information should be reproduced.

The disk used in the invention, its recording format, and its application will be outlined hereinafter.

A movie, for example, may be recorded on a disk associated with the present invention. In this case, pieces of language information which are related to the movie are also recorded on the disk. Subtitle information in a plurality of languages is also recorded so as to correspond to the movie. In the case of a disk on which Kara-OK is recorded, Kara-OK music, a background image, and corresponding words information in a plurality of languages are recorded on the disk.

FIG. 2 shows examples of information pieces recorded on the recording medium (hereinafter called "disk").

FIG. 2A shows an example of a disk 1 on which a movie is recorded. When data string #0 is selected in a reproduction operation, the image is reproduced and the environmental sound and music (B & M) are reproduced at the same time. In this case, there is no speech, and one of data strings #2 to #7 is selected. In data strings #2 to #7, speeches D2 to D7 in different languages are recorded. This enables the user to see the image, hear the environmental sound, and listen to the music and the speech in a given language. "D1+B & M" in data string #1 means that selecting this data string causes the image, the environmental sound and music, and the speech in the language specified by D1 to be reproduced. When data string #1 is selected, a video decoder reproduces the image, and a first audio decoder reproduces environmental sound, music, and the sound of speech in the language specified by D1. When another data string is further selected, a second audio decoder reproduces the speech in the selected language. Thus, the user can listen to two languages at the same time, for example. In this way, the reproduction apparatus of the invention contains two decoders in order to reproduce at least two speech data strings.

FIG. 2B shows an example of a disk on which Kara-OK is recorded. When data string #0 is selected, Kara-OK (recorded accompaniment) is reproduced. When one of data strings #1 to #7 is further selected in this reproduction state, speech in a different language is reproduced. In the case of Kara-OK, the words may some times differ from language to language. In this case, the subtitles are also reproduced to the words and made to appear on a display unit. After having learned the melody by heart, the user can enjoy singing a song with only the subtitle displayed in the desired language, muting the words by operating the reproduction apparatus.

FIG. 2C shows another example of a disk on which Kara-OK is recorded. When data string #0 is selected, Kara-OK (recorded accompaniment) is reproduced. When data string #1 is selected and reproduced in this reproduction state, a guide vocal is reproduced. This enables the user to enjoy Kara-OK in a normal audio-visual condition. Reproducing only data string #2 allows the user to listen to the melody line only (this may be combined with the reproduction of data string). While data string #0 is being produced, data string #3 may be reproduced. In this case, male voice is reproduced in, for example, stereo channel L, and female voice is reproduced in, for example, stereo channel R. This enables the users to enjoy performing a duet, by turning either channel output of data string #3.

In the above, use of two disks shown in FIGS. 2B and 2C has been described. Nonetheless, The program on the disk of FIG. 2B and that on the disk of FIG. 2C may be stored on a single disk.

FIG. 2D shows another example of a disk on which Kara-OK is recorded. When data string #0 is reproduced, the speech is also reproduced together with Kara-OK (recorded accompaniment). When data string #1 is reproduced simultaneously with the speech, the output sound turns to Kara-OK, with the solo being erased. This is because the solo sound is inverted and recorded. This enables the user to enjoy singing to Kara-OK by himself. When data string #2 is reproduced while data string #0 is being reproduced, a duet is selected and solo 1 (stereo channel L) and solo 2 (stereo channel R) can be erased. By suppressing the sound of one of the L and R channel outputs of data string #2 on the reproduction apparatus side, the sound of the other channel can be erased. In this case, the sound of the suppressed channel is the output sound of data string #0.

As explained above, when data string #1 is reproduced, the solo sound is inverted and recorded. If an inverter circuit is used on the reproduction apparatus side, the solo sound may not be inverted before recording.

FIG. 2E shows an example of a disk on which full orchestral music is recorded. In data string #1, the sound of instrument 1 is inverted in phase and recorded. Thus, when data string #0 and data string #1 are reproduced, all orchestral music, other than the sound of instrument 1 (for example, the piano) is output. This allows the user to practice the piano to orchestral accompaniment. Similarly, in each of the other data strings, the sound of a single instrument is inverted in phase and recorded. Reproducing each data string enables the sound of the instrument for the corresponding data string to be erased.

As explained above, when data string #1 is reproduced, the sound of instrument 1 is inverted in phase and recorded. An inverter circuit is used on the reproduction apparatus side. Then, the sound of instrument 1 may not be inverted in phase before recording.

FIG. 3A shows the information area on the optical disk 10. A management area is formed on the center part of the optical disk 10, and a data area is formed outside the outer perimeter of the edge of the management area. In the management area, management data for managing the data in the data area is recorded as will explained later. In the data area, information including subcode information, subpicture information, audio information, and video information is recorded.

First, the types of information recorded in the data area will be explained, with reference to FIG. 3B.

FIG. 3B is an enlarged view of the contents of data unit DUT #0 in the data area. Data unit DUT #0 begins with a subcode (SUB-CODE) followed by, a subpicture (SUB-PICTURE), audio information (AUDIO), and video information (VIDEO) are recorded in the order mentioned. The subcode (SUB-CODE) contains the attributes of data unit DUT #0 and control information on the data unit. The subpicture (SUB-PICTURE) contains, for example, subtitle information (for movie video) or character information (for Kara-OK video and educational video). The subtitle information and the character information are each given PICTURE #0 to #7. All PICTURES #0 to #7 differ from each other in language. Alternatively, some of them differ from each other in language, and the remaining PICTURES contain no signal. The audio (AUDIO) information is recorded in up to eight different languages AUDIO #0 to #7 (each reproduction corresponds to approximately one second). Each piece of audio information is recorded in frames, and each of frames #0, #1, . . . is composed of headers (HEADER) and data (DATA). The video information (VIDEO) contains 30 frames of images (approximately one second of reproduction), for example. The video (VIDEO) formation is recorded by high-efficient coding image compression techniques. The number of frames is not standardized. The audio information is also subjected to high-efficient coding image compression.

As described above, at least two decoders for speech reproduction are built in the reproduction apparatus because different languages are recorded on the optical disk, and any one of them can be combined with the apparatus in operation. For expensive models, there may be used more video decoders, speech decoders, and subtitle and character information decoders.

The management information recorded in the management area will now be explained. The management information is stored in the form of a table.

The management table includes the innermost volume identity field (VID), the program information field (PIF) provided around the outside of the VID, and the data unit allocation table (DAT) located around the outside of the PIF.

VID is written starting at the first byte in the management table. It indicates information on various elements throughout the disk by using 256 bytes. For instance, the information includes information as to whether the disk is for general recording or for reproduction only.

World language codes are defined as shown in FIG. 4A. Specifically, to show what languages are recorded in the data area, a table is constructed so that language codes may correspond to description codes 0, 1, . . . , 8. In this example of a disk, language codes correspond to description codes. More precisely, description code 0 corresponds to non-language, or environmental sound and music (B & M); and description codes 1, 2, 3 and 4 correspond to English, Japanese, French, and German, respectively. By reading the VID, the user can understand the description-language correspondence.

Bit data strings are defined in the PIF table. Description codes correspond to data string numbers #0 to #7 on the disk (FIG. 3B). When a data string number is selected, a description code is selected and the language code corresponding to the selected description code is also selected.

Figures 5A, 5B:
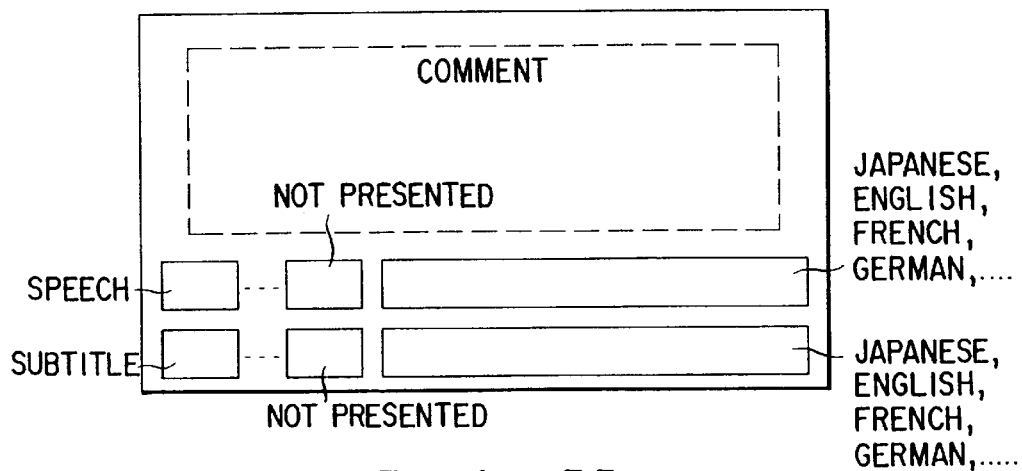
FIGS. 5A and 5B show examples of the menu screens displayed by the reproduction apparatus.

Therefore, once the data in the PIF table has been read, the reproduction system can display words in each language (a display by the user acknowledge display signal) on the screen in accordance with data string numbers #0 to #7 (a display by the key display signal) (FIG. 5A). This display is effected by, for example, giving a language code (FIG. 4A) to a conversion table to generate the display data corresponding to each language code. FIG. 5A shows an example of English and Japanese representation. Here, the user can select a world language he or she can understand. When the user wants to learn a desired language while seeing a film, he can select the language.

When the representation appears in the user acknowledge language as shown in FIG. 5A, the user may operate the operator section, thereby inputting the key information on any one of data string numbers #0 to #7 (user acknowledge key information display signal).

For example, when the user selects #0, description code 1 appears as shown in FIG. 4B. At this time, D1 (i.e., English) is selected for speech. When the user selects #2, D2 (Japanese) is selected for speech.

As described above, after the user has selected a language, a comment made in the language by the producer is displayed. The data address corresponding to the recorded position of the comment information is put in the VID table, for example. The comment information is displayed in the user acknowledge language. For example, as in the second menu screen shown in FIG. 5B, the display appears in the language selected by the user at the first menu screen. When the user selects #2 at the first menu screen, the comments appear in Japanese. The comments include the producer's greeting, the date of production, the reason for having made the product, and the program time in the case of movies, for example. Seeing these comments displayed on the screen, the user can select an output mode for speech and subtitles. For example, the user can push a speech and subtitle change button at the operator panel. When he pushes the speech change button, a cursor appears on the screen. Thereafter, each time he depresses the button, the cursor moves from one item to another, starting at none and moving to Japanese, English, French, German, ... in the language column. When the cursor reaches the desired portion, or when a certain period of time has elapsed, then the mode at that portion is selected. Pressing the subtitle change button operates similarly.

If neither the speech select button nor the subtitle change button is operated for a certain period of time, the reproduction mode selected at the first menu screen will be effected. The speech output mode and the subtitle display mode can be changed during operation on the reproduction apparatus side.

In the PIF, information on various elements of each program is recorded. For example, 16 bytes are used for each program. The information on various elements includes the start and end time of the program, whether the program is for home video, movie, Kara-OK, computer graphics, interactive use, game, or computer data, the identification of a speech encoding system, the identification of an image encoding system, the picture attributes, (e.g., information for identifying the aspect ratio and a system such as the PAL or the NTSC system), and information on horizontal resolution and vertical resolution. It also includes a start pointer, in which a pointer value indicating the DAT address (data unit number) is recorded within which the data unit at the program starting point is stored.

The DAT, records, in table form the information indicating order for data to be read the data area after a program to be reproduced is determined and the identification of the program is known.

The DAT table, includes parameters such as the zone number (NZON) on the disk, the sector number (NSTC), the track number (NTRC), the program time (PTMB), and the link pointer (PNTL). From the zone number (NZON), track number (NTRC), and the sector number (NSTC), the recording sector at the start of the data unit can be determined. The NZON is the zone number to which the recording sector at the start of the data unit belongs. The disk is divided in units of tracks, along the radius from the innermost track. The zone numbers are allocated in sequence, beginning with 0 at the innermost zone. A zone consists of many tracks and is given a track number. The NSTC is a sector number in the track. The sector number is not a serial number associated with another track or zone, but is a number which completes only in the track. The NTRC is a track number in the zone. The PTMB is a flag representing the time position information on the image data (on a picture) at the start of the data unit. The position information indicates a relative elapsed time (in seconds) from the program starting point. The time position information is used for time code searching. The time position information is taken in the reproduction apparatus and used as the start reference data when the program time, absolute time, remaining time, etc. are displayed. The PNTL is a flag showing a subsequent data unit immediately following the present data unit number in time. The unit corresponds to the data unit number. When there is no link destination at the program end, all bits are set at 1 (=0× FFFF). The effective value for the link pointer ranges from 0×0000 to 0×FFFF.

When a program (e.g. data unit) to be reproduced is selected the system control section 204 causes the pickup driving section 104 to move the pickup 103 so as to read the desired program.

The features of the recording method for the above disk will be described below.

Figure 6:
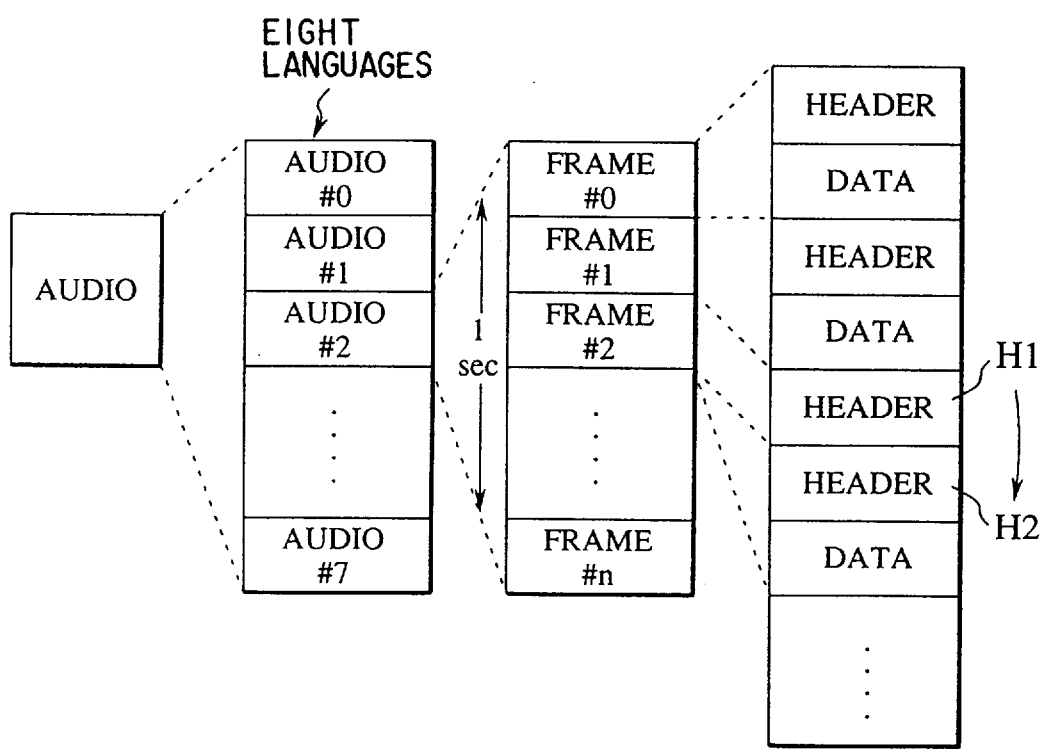
FIG. 6 shows an example of the format for audio information on the disk.

FIG. 6 is related to the audio information. In the audio information, speech frames in a plurality of languages are defined in a single data unit in association with an image, as explained with reference to FIG. 3B. FIG. 6 is an enlarged view of the audio information section in a data unit. The audio information section is allocated units #0 to #7, and has up to eight languages recorded in it. In the case of a movie disk, the speech contents corresponding to each data string number are recorded as described in FIG. 4B. A single unit (in this case, unit #2 is enlarged) contains as many data frames as it would take to reproduce in approximately one second. As can be understood from the enlarged view of a frame, the data frame basically consists of pairs of a header and a set of data. In headers and data sets alternately arranged, there is provided a portion marked with an arrow, where a header immediately follows another.

For convenience's sake, the consecutive headers are assigned reference characters H1 and H2, respectively. In the figure, header H1 is not followed by a data area but immediately followed by header H2. This means that the data corresponding to header H1 represents silence. Thus, when the reproduction apparatus reads header H1, it decodes the time information (a period of time the data is reproduced) contained in header H1, and generates silence (data 0) for that period of time.

When silence continues in this way, the system records only header H1 and does not record data 0 as the data that follows. This makes it possible to increase the recording density.

In the above description, the data units, i.e., starting with subcode (SUB-CODE), subpicture (SUB-PICTURE), audio (AUDIO) and video (VIDEO), are recorded in the order of pickup reading (from the top in the figure), as illustrated in FIG. 3B.

The sequence is not limited to this format. In the embodiment of FIG. 3B, this order is effective in the case where data processing has to be effected with small hardware.

This means that the largest video data in a data unit is placed at the end and read last. Hence, the subimage to be decoded and the speech data can be stored in a read buffer during the read operation. While the video data at the end has begun to be decoded, the subimage and the speech data can also be decoded. Because the above arrangement enables the above described processing scheme, no large read buffer is required. This helps to simplify the hardware.

The above arrangement is also effective in high-speed reproduction. The audio (AUDIO) information is read first and recorded in a memory. Then, the video (VIDEO) is read at intervals and decoded. When the signal is supplied to the monitor, the audio (AUDIO) information is thinned out according to the rate at which the video (VIDEO) frames have been thinned out. For such a process it is convenient to take in the audio (AUDIO) information in advance and decode it.

A case where a movie is reproduced in the reproduction mode will be described.

Figure 7:
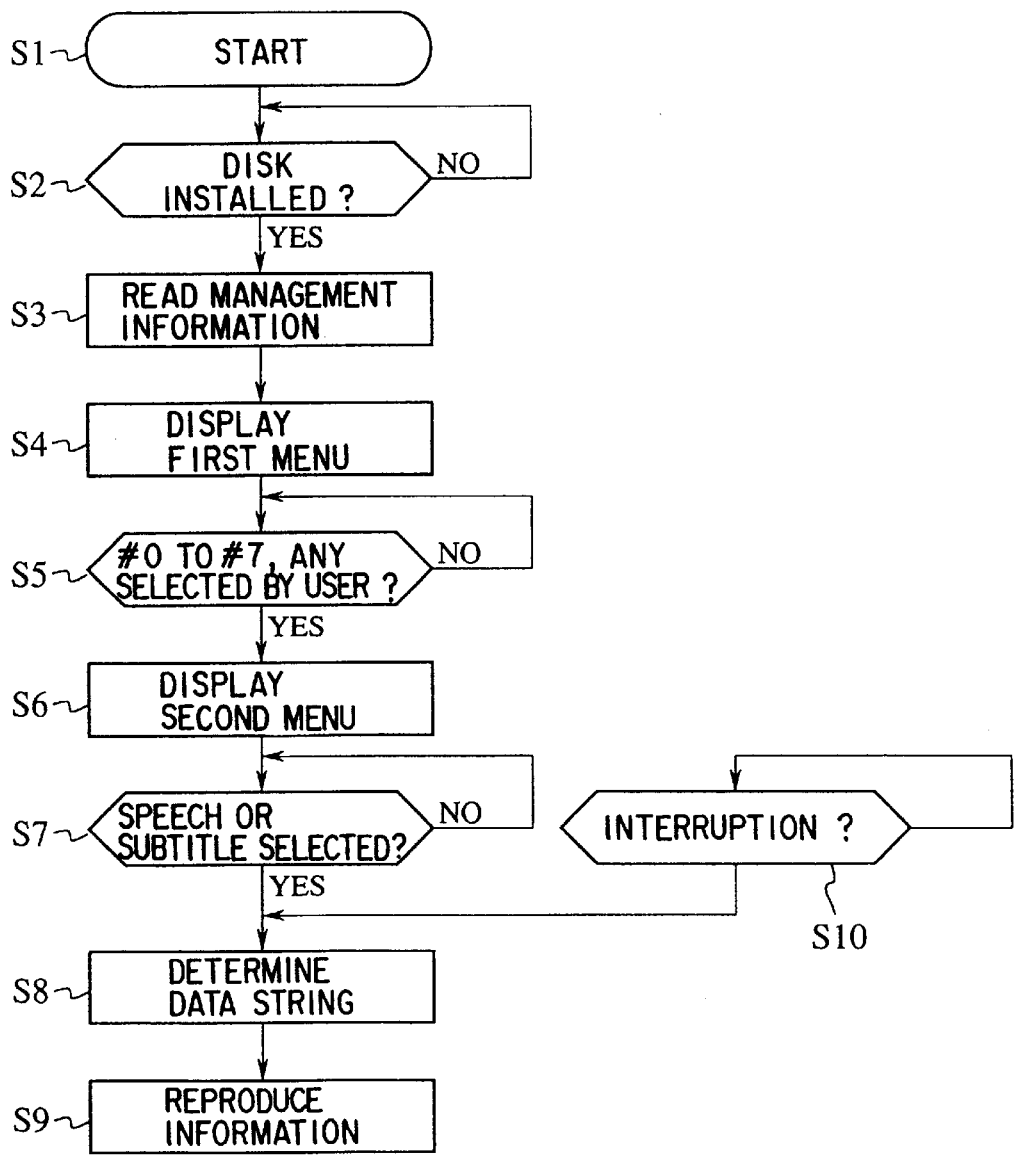
FIG. 7 is a flowchart explaining the operation of the reproduction apparatus.

FIG. 7 is a system control flowchart explaining how the system control section 204 operates when the user installs a disk 100 in the apparatus. When the disk 100 is installed, the VID and PIF in the management area in the disk are read automatically and stored as a table into work memory incorporated in the system control section 204 (FIGS. 4A and 4B). It is determined what type (movie or Kara-OK) of disk has just been installed (Steps S1 to S3). Then, the first menu screen (FIG. 5A) is displayed (Step S4). Next, it is determined which world language is selected by the user (Step S5). After the user has entered a select input, the second menu screen (FIG. 5B) is displayed (Step S6).

In the VID area, the start data address for reproducing the menu screen is also recorded. When the user selects the first language at the first menu screen, the address for the read data for the second menu screen is determined, depending on the selection. The data on the first or the second menu screen may be stored as a still picture in the data area on the disk or in the end portion of the VID area.

Comments are displayed on the second menu screen. The user is asked which language he wishes to select for speech and subtitles. On the first menu screen the comments are made in the world language selected. On this screen, the user can set a language for speech and that for subtitles (Step S7). For example, English can be for subtitles and Japanese for speech, or vice versa. Further, other languages may be combined. This determines the data strings for the reproduced sound.

After the data strings for reproduced sound and subtitles have been determined, the system control section 204 causes the data string processing section 203 to specify the subpicture number for obtaining the subtitle output from the subcode shown in FIG. 3B and the audio number for obtaining the speech output (Step S7). After this, control goes to a reproduction process (Step S9).

The subpicture and audio specification can be canceled or changed in the course of reproduction. If so, a specification change operation is effected. To do this, a subtitle change button or a speech change button is operated. Then, an interruption occurs in Step S10, which causes the data string processing section 203 to change data selection.

Figures 8A, 8B:
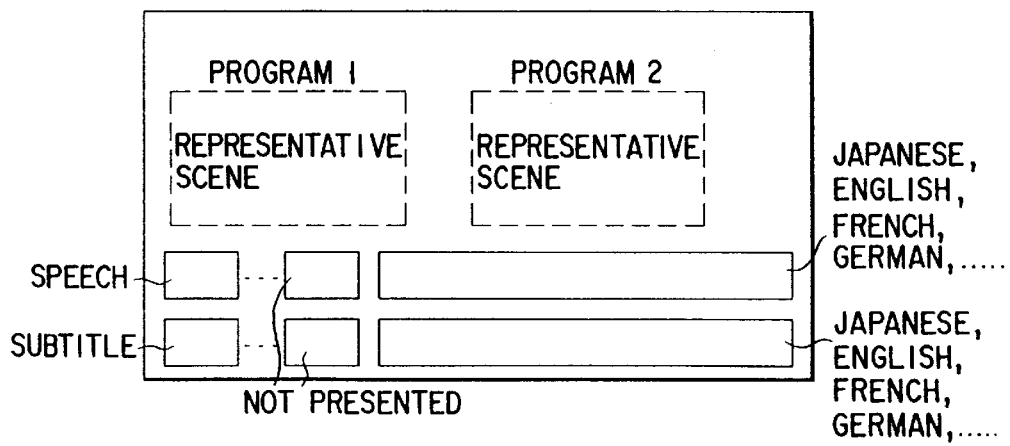
FIGS. 8A and 8B show other examples of menu screens displayed by the reproduction apparatus.

As described above, a movie is recorded in a single disk. There be a case where more than one movie is recorded in a single disk. In this case, the first menu screen as shown in FIG. 8A appears (this screen is the same as that in FIG. 5A). When the user selects a language, program 1 and program 2 are displayed along with still pictures of typical scenes, as shown in FIG. 8B. The user operates a program select button to move the cursor to program 1 or program 2. If the cursor is on the desired program when the program select button is left untouched, the program will be selected upon lapse of a certain time. Once the program is so selected, the comments on the selected program appear as shown in FIG. 5B. From this time onwards, the selection of speech and subtitles is made as explained in FIGS. 5B and 7.

Figure 9:
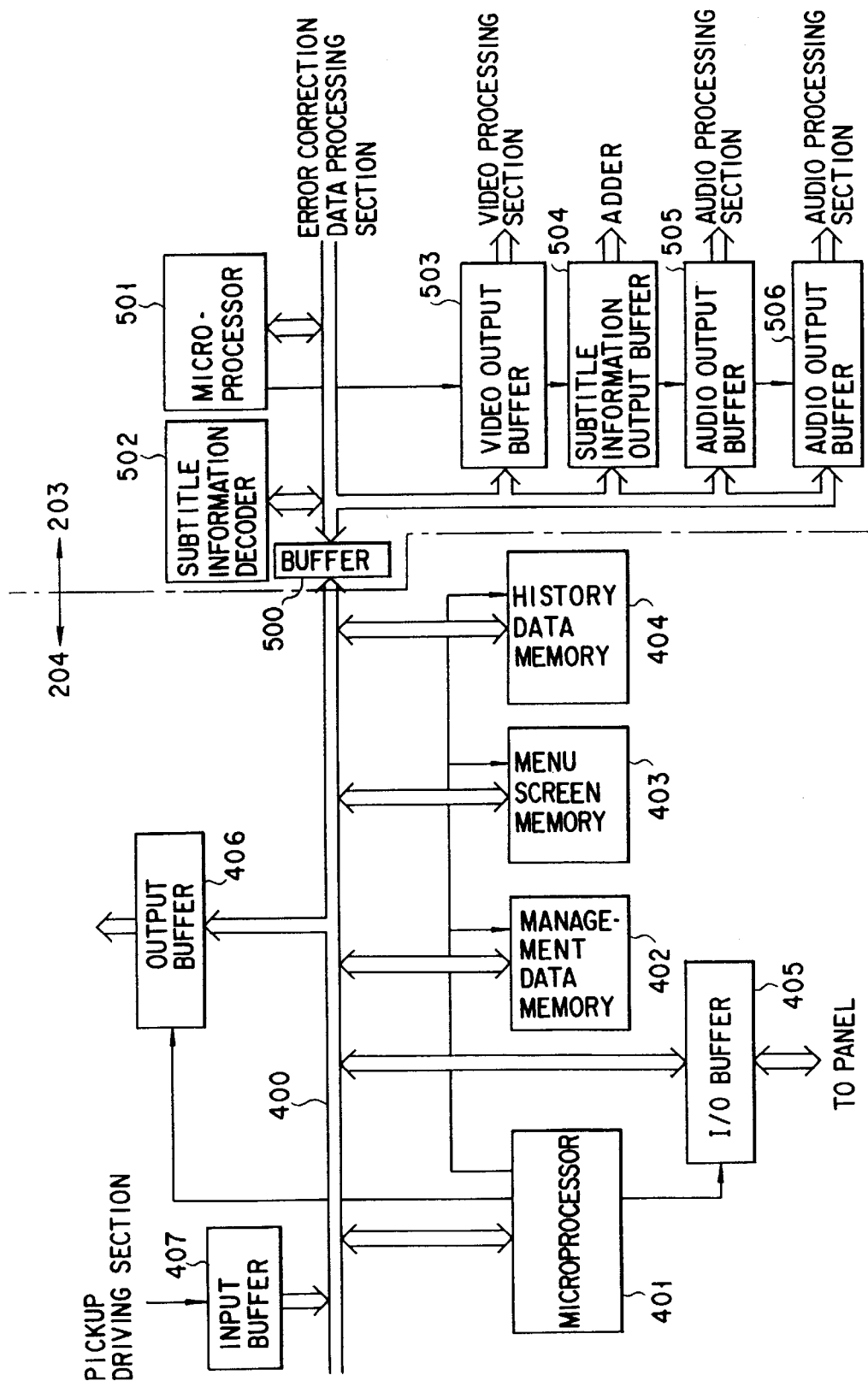
FIG. 9 is a block diagram of the system control section and the data string processing section, both incorporated in of the reproduction apparatus.

FIG. 9 shows an example which can memorize the history of language select information.

In the above embodiment, each time a disk is inserted, the user looks at the menu screen and selects a world language, a speech language, and a subtitle language. The apparatus may store the history of the languages the user has selected in a memory section, making it easier for the user to select languages.

FIG. 9 shows a basic internal arrangement of a data string processing section 203 and that of a system control section 204. A microprocessor 401, a management data memory 405, a menu screen memory 403, a history data memory 404, and an input/output data buffer 405 are connected to a data bus 400. The input/output buffer 405 is used to enable data exchange between the microprocessor 401 and an operator section 205. Also connected to the data bus 400 is an output buffer 406 for sending control data to a pickup driving section 104. Disk sense information generated at the time when a disk is installed in the apparatus can be retrieved from input buffer 407 via the data bus. The data bus 400 is also connected to a microprocessor 501 of the data string processing section 203 by a buffer 500. The data string processing section 203 also comprises a subtitle information decoder 502, a video output buffer 503, a subtitle information output buffer 504, and audio output buffers 505 and 506.

When a disk is installed, the management data on the disk is read and stored in the management data memory, as has been explained earlier. The data on the first menu screen is also read and rendered corresponding to the data string numbers. The menu screen is displayed as shown in FIG. 5, for example. The menu screen data is read from the memory 403 and sent to the video processing section 206 via the video buffer 503. Looking at the menu screen, the user selects a language. The select information is read via the input/output buffer 405 and decoded by the microprocessor 401. If the language selected is Japanese, the data address, corresponding to the data on the second menu screen corresponding to Japanese, is determined by the table stored in the management data memory 402. The pickup driving section 104 is controlled via the output buffer 406 so as to read the second menu screen (including the comments). The data on the second menu screen has been fetched and stored in the memory 403. The same data is output via the video output buffer 503. Looking at the second menu screen, the user enters the select information. That is, for a movie, information for selecting a language for subtitles, a language for speech, etc. is entered.

These select information pieces are stored in the form of a table, in the history data memory 404. For example, the frequency at which an initial language is selected on the first menu screen, the frequency at which a language for speech is selected on the second menu screen, and the frequency at which a language for subtitles is selected are stored. The frequency information pieces can be used after the user has made, for example, 10 to 20 selections.

Figure 10A:
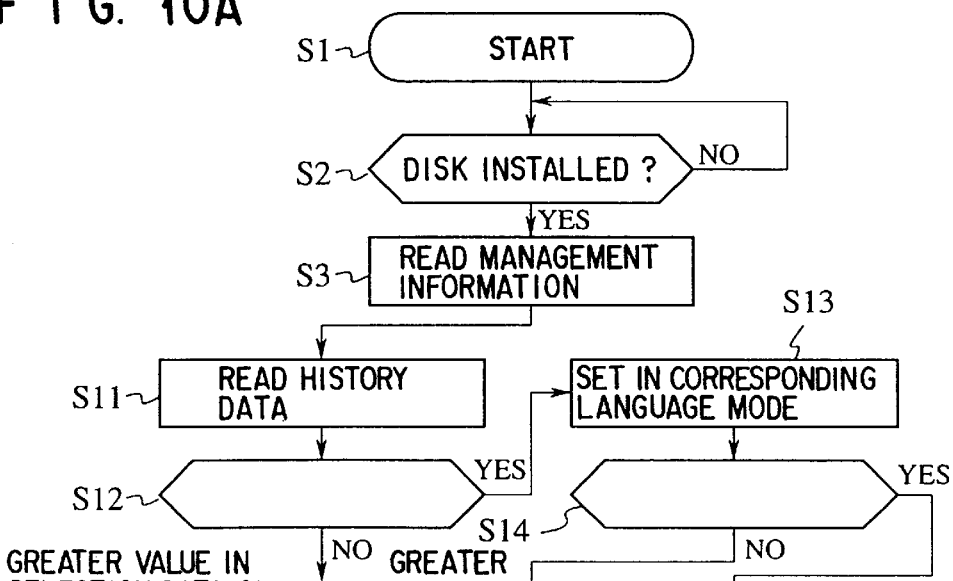
FIG. 10A is a diagram showing the table information stored in the system control section of FIG. 9.

FIG. 10A shows an example of a table stored in the history data memory 404. As shown in the figure, the number of times English is selected is the greatest in the first menu screen, and the number of times Japanese is selected for speech and English for subtitles is the greatest in the second menu screen. Once the history data is accumulated in this way, the microprocessor 401 determines if there is any frequency data item larger than a specified value, when the disk is installed. If a frequency data item larger than the specified value is present, a data string is automatically identified by using the select information corresponding to the frequency data item larger than the specified value—without waiting for the user to enter an input. That is, control skips Steps S5 and S7. In this case, if the user wants to make a change, he may carry out a change operation in Step 10 in FIG. 7.

Figure 10B:
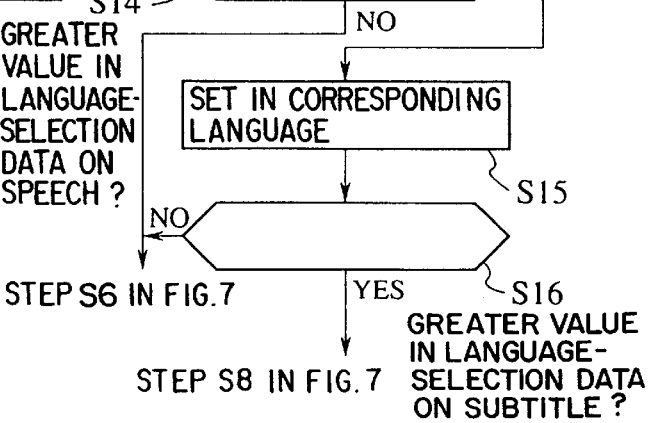
FIG. 10B is a flowchart explaining the operation of the data string processing section.

FIG. 10B shows another example of the processing routine of FIG. 7. After the management information has been read, control proceeds to Step S11, thereby reading the history data. Then, it is determined whether or not the select information on the initial language contains any information item greater than a specified value (Step S12). If such an information item is not found, the control goes to Step S4 in FIG. 7, and if an information item larger than the specified value is present, a corresponding language mode is set (Step S14). Next, it is judged whether or not the language select information for speech contains any information item larger than a specified value (Step S14). If such an information item is found, a mode for a corresponding language for speech is set. Then, it is determined whether or not the subtitle language select information contains any information item greater than a specified value. If such an information item is present, the control goes to Step S8 in FIG. 7. Otherwise, the control proceeds to Step S6, in which the second menu screen appears.

In the above embodiment, for language selection, a menu screen appears and the information on the menu screen is recorded on a disk. A language selection manual comes with a disk or a reproduction apparatus. If so, the reproduction apparatus itself may contain a language select and select state display function.

FIGS. 11A–11C show an example of a reproduction apparatus 600 provided with a display section 601 such as a liquid-crystal display. Numeral 602 indicates a select button and 603 indicates a select setting button. When a disk is installed, a representation for a first initial language select appears as shown in FIG. 5A. Each time the user presses the select button 602, characters #0 to #7 change one after another. When the number corresponding to the desired language appears, the user presses the select setting button 603, thereby setting the language mode. In this state, comments may appear on the screen as shown in FIGS. 5 and 8. When the select setting button 603 is pressed, the world language mode is determined as shown in FIG. 11B. The example in FIG. 11B shows a state where #2 is determined. The speech language select mode is activated. Each time the user presses the select button 602, characters #0 to #7 change one after another. When the number corresponding to the desired language appears, the user presses the select setting button 603, setting the speech language mode. FIG. 11C shows a state where #0 is determined for a speech language. Thereafter, a subtitle language is also selected in a similar manner. When speech is not required or when subtitles are not necessary, the user pushes a pass button 604.

In the above embodiment, the buttons 602, 603, and 604 and the display section are provided on the reproduction apparatus 600. Instead, they may be provided on a remote control section. While, the user can make a language selection whenever he wants to in the above reproduction apparatus, a language initially set may always be selected by providing a language-fixing button provided on the back of the reproduction apparatus. By providing such a language-fixing function, unauthorized operations can be prevented when the apparatus is used in a place where various people are gathering for business, for example.

Next, the functions of the reproduction apparatus that operate when a Kara-OK disk is used, will be described.

Figure 12A:
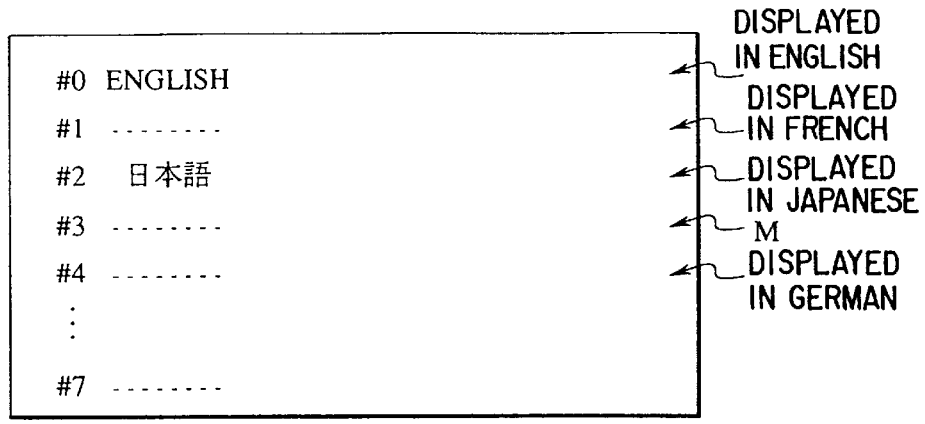
FIGS. 12A to 12C show other examples of the menu screen displayed by the reproduction apparatus.
Figure 12B:
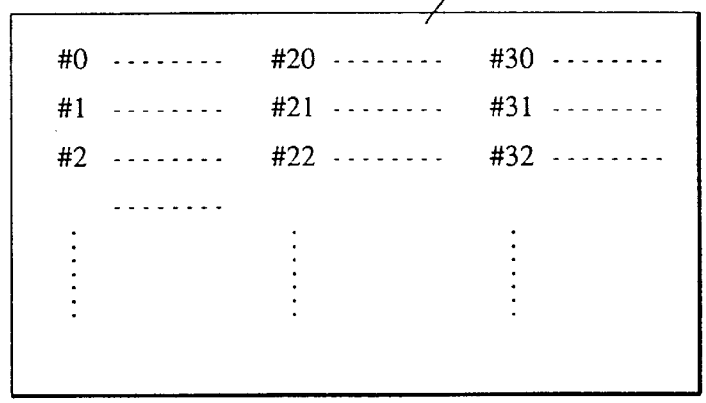
Figure 12C:
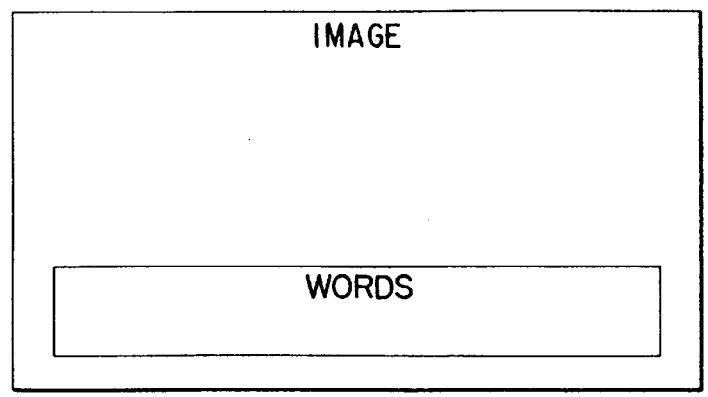

FIG. 12A shows an example of the first menu screen. In the case of Kara-OK, selecting #3 enables selection of music only, for example. when the user selects #2, for example, this means that Japanese is selected from the world languages. Then, a title select screen appears in the second menu screen (FIG. 12B). Looking at the title select screen, the user selects the title of the desired musical composition. Then, the background image and words are displayed and the performance mode is activated (FIG. 12C).

In this case, the languages for subtitles is automatically set and the world language selected.

FIG. 13 shows the data processing scheme in which the reproduction apparatus reproduces a Kara-OK program. When a disk is inserted in the reproduction apparatus, its type is identified from the contents of the management information (VID) (Steps S21 to S23). Then, the first menu screen is displayed (FIG. 12A). After a world language has been selected, a select code for the subtitle language corresponding to the language is created. The codes for subtitle languages corresponding to world language codes are stored in table form in the PIF. In Step S24, the code for the corresponding subtitle language is searched for and stored temporarily according to the code of the selected world language. Next, in Step S5, many titles are displayed. The data on titles may be stored in images in the data area or may be stored in the VID area. Looking at the menu screen of FIG. 12, the user can select titles and enter the number of the desired title from the keyboard. After the title has been selected, the reproduction apparatus moves the pickup to the address at which the specified title is recorded, thereby staring a reproducing operation. To select the subtitle information, the subtitle information corresponding to the select code decoded in Step S24 is reproduced (Steps S25 and S26).

As described above, a title is selected on the second menu screen. This inevitably makes a second user waste time before selecting a title. To prevent such waste of time, a title can be selected by interruption in the Kara-OK mode. In this case, a second user can look at a title-select number correspondence table (which comes with the purchased disk) and make reservations one after another.

FIG. 14 shows a reservation routine.

At Step S31, it is determined by interruption whether or not a reservation operation has been made. If a reservation operation has been effected, the number of the title and the select information on the subtitle language are read as reservation information. When the select information on the subtitle language is not entered, the subtitle language selected by the first user is used as a selected subtitle language (Steps S31 and S32). After the data on the reservation number of the title has been entered, the apparatus determines whether or not the current disk contains the reserved title (Step S33). If the reserved title is present, a dot is added to the display section of a remote control or to the dot array of the video screen and the result is stored in a reservation memory (Steps S34 and S35). This enables the user to understand the reservation state. When there are many dots indicating reservations, a cancel key may be provided and operated to cancel reservations.

If there is no reservation number of a title, a blinking representation appears on the video screen to tell the user that the desired title is not contained in the disk.

Figures 14A, 14B:
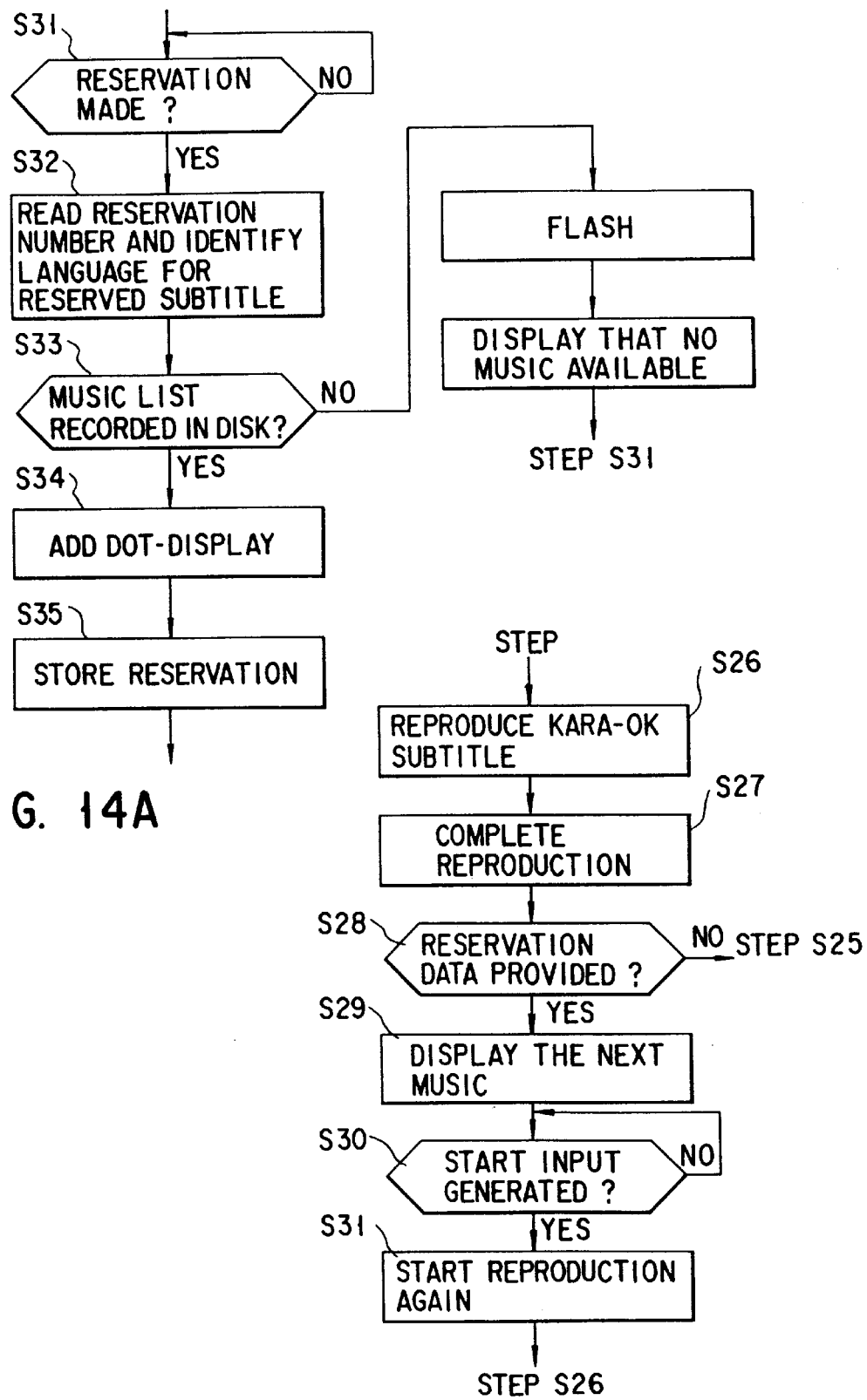
FIGS. 14A and 14B are flow charts other than that of FIG. 13.

FIG. 14B is a flowchart explaining the processing performed after Step S26 in FIG. 3 in the reproduction apparatus with a reservation function. When a subsequent title is selected (when a reservation information item is stored) after the reproduction has been completed, the subsequent title and its number are displayed on the screen. The subsequent title and its number are stored in the reservation memory incorporated in the apparatus (Steps S27 and S28). If the subsequent reservation information item does not exist in the work memory, the control returns to Step S25 and the second menu screen appears to provide a list of titles. If the reservation information item is present, the subsequent title (title number, title, etc.) is displayed and a start operation is waited for (Steps S29 and S30). When a start operation is performed, the title and Kara-OK for the subtitles are reproduced (Steps S30 and S31).

FIG. 15 shows an example of the menu screen displayed when a training Kara-OK disk (FIGS. 2C, 2D, and 2E) is reproduced. First, a select menu of world languages appears on the first menu screen in FIG. 15A. Then, the titles in the selected world language and corresponding numbers are displayed on the second menu screen (FIG. 15B). After this selection, a third menu screen appears as shown in FIG. 15C. The third menu screen enables the user to make a selection according to the type of practice. For example, if the user wants to sing a song to normal accompaniment, he needs only to push first the #0 key and then the setting button. If he wants to reproduce a guide vocal only, it sufficient for him to push first the #1 key and then the setting button. If he wishes to listen to Kara-OK and a melody line, he only has to press the #0 and #2 keys and then the setting button. While the disk is being reproduced, the above reservation function may be activated.

FIGS. 16A and 16B shows other examples of the third menu screen displayed when a training Kara-OK disk is reproduced. The procedures as far as selection of titles are the same as those in the first and second menu screens in FIG. 15. In the case of the screen of FIG. 16A, a tune played on all instruments in a full orchestra is reproduced when the #0 key is pressed and then the setting button is depressed. When the #0 and #1 keys are first pressed and then the setting button is pressed, piano sound is erased from the reproduction, for example. More specifically, when data string #0 and data string #1, for example, are reproduced, the sound obtained by subtracting instrument 1 (e.g., a piano) from a full orchestra is output. The user can therefore practice the piano to an orchestral accompaniment. Similarly, the sound of individual instruments is inverted in phase and recorded, respectively, in the other data strings. By reproducing each data string, the sound of the instrument for a corresponding data string can be erased. When more audio decoders are added, the sound of more than one instrument can be erased. Conversely, by reproducing only data string #1 or #2, the user can listen to the sound of the corresponding instrument only.

In the case of the screen of FIG. 16B, as well, things similar to those in FIG. 16A can be done. When data string #0 is reproduced, the accompaniment and the speech are reproduced simultaneously. Thus, when data string #1 is reproduced at the same time, the solo sound is erased, enabling the user to practice a solo.

FIG. 16C is related to a disk on which a chorus is recorded in data string #0, and similarly, minus tenor, minus alto, minus bass are recorded in data strings #1, #2, and #3, respectively. The user can therefore practice each part by erasing the corresponding training part.

For example, when audio decoders are increased to three, the reproduction of data strings #1, #2, and #3 enables users to listen to music with an earphone and practice each part.

Figure 17:
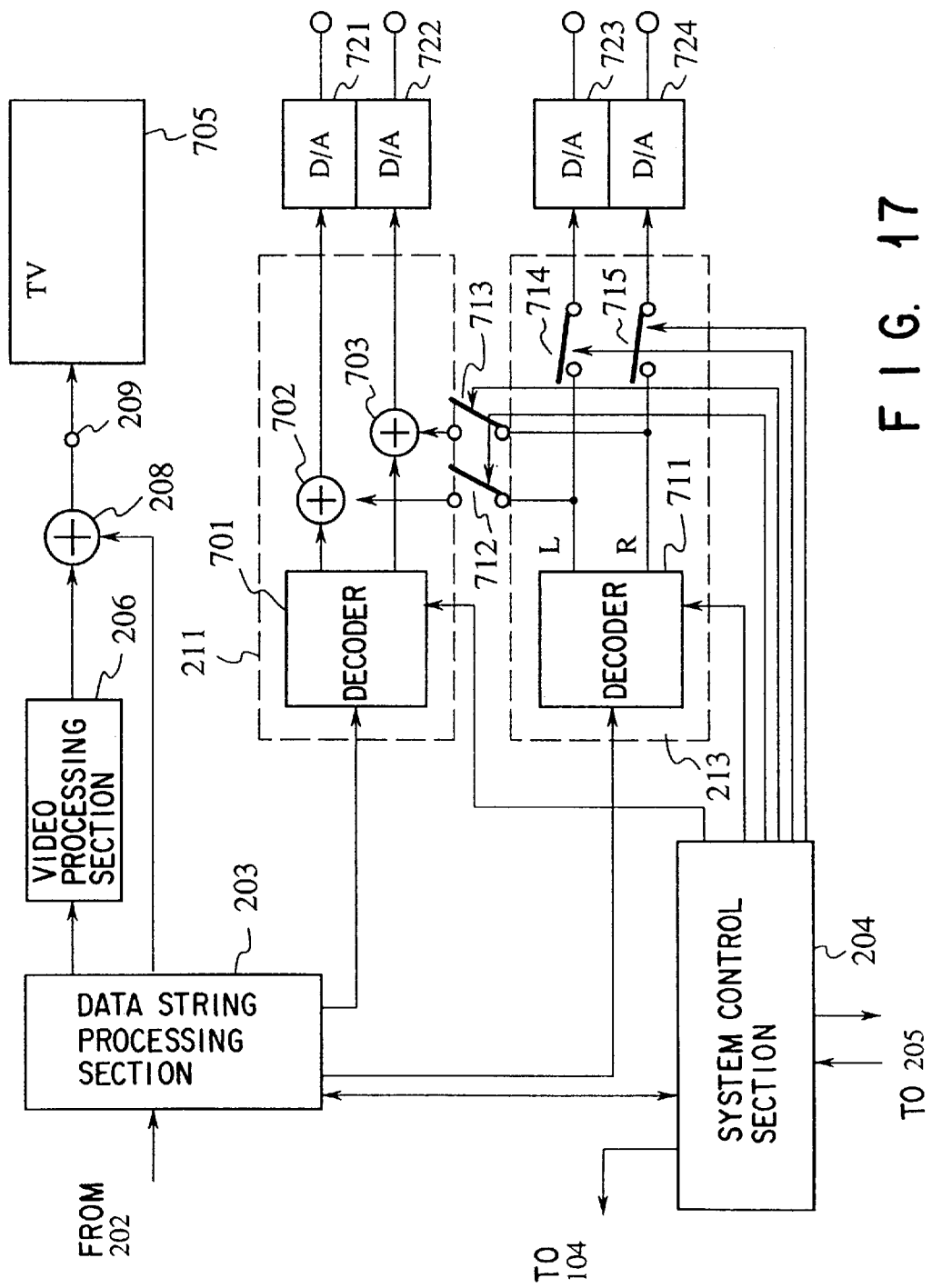
FIG. 17 is a block diagram showing in detail the audio processing section incorporated in the reproduction apparatus of FIG. 1.

FIG. 17 shows the relationship between the system control section 204 and the audio processing sections 211 and 212. The L channel and R channel audio signals reproduced by a decoder 701 of the audio processing section 211 are input to adders 702 and 703, respectively. The outputs of the adders 702 and 703 are respectively supplied to digital-to-analog converters 721 and 722, which convert the outputs into analog signals. The L channel and R channel audio signals reproduced at a decoder 711 of the audio processing section 212 are respectively supplied to switches 712 and 713 and to digital-to-analog converters 723 and 724 via switches 714 and 715. The converters 723 and 724 convert the supplied signals into analog signals. The outputs of the switches 712 and 713 are supplied to the adders 702 and 703.

The system control system 204 can supply a volume control signal, a sound quality control signal, and the like, for right and left channels to the decoders 701 and 711. It can also supply a switching signal for the switches 712 and 713.

For example, when it is desired that while data string #0 is being reproduced as shown in FIG. 16A, data string #1 is reproduced with piano sound being erased from the full band sound, the signal of data string #0 is input to the decoder 701 and the signal of data string #1 is input to the decoder 711. Then, switches 712 and 713 are turned on, and the switches 714 and 715 are turned off. Inverted in phase with respect to the piano signal of data string #0 and then recorded, the piano signal of data string #1 will be erased at the adders 702 and 703. For example, as shown in FIG. 16B, one of the L and R channels is combined and erased so that they user may practice one part of a duet. In this case, too, the switches 714 and 715 are turned off. The output of the video processing section 206 and a subtitle image are added by the adder 208. The resultant image appears on the video monitor 750.

The recording mode and display mode of the world language and the recording mode and select display mode of the audio signal for the first menu screen are not limited to those described in the above embodiments. Other modes may be used for the first menu screen. In the embodiments described above, the selected information items appearing on the menu screens are, of course, recorded as management data in the management area on the disk.

For the first menu screen appearing for selection of world languages, a world map may be displayed on which the national flags, marks, or numbers are put at the places where the languages recorded on the disk are used, and the desired language may be selected by moving the cursor to the desired flag, mark, or number or by operating the keyboard to enter the corresponding symbol.

FIG. 18A shows an example of management information having speech data strings one of which contains the subspeech explaining the contents of the image. The subspeech is a speech explaining the state of the image so that people with poor eyesight can understand easily. In the management information on a disk of FIG. 18A, the environmental sound corresponding to the image is recorded in data string #0, the environmental sound and a first world language (D1) are recorded in data string #1, a second and third world languages (D2 and D3) are recorded in data strings #2 and #3, respectively, and a subspeech (for example, in the first world language) is recorded in data string #4. When a first user wants data string #1 and a second user wants data string #4, the first user can understand the contents of the image from the sound and image on the monitor 750, while the second user can understand the contents of the image from the subspeech coming from a speaker 762 and a subspeech output amplifier 761. When the second user wants a world language D2 of his mother tongue different from D1, he can listen to his mother tongue through an earphone 763, which enables him to understand the contents of the image in language D2 while looking at the image.

As described above, the reproduction apparatus of the invention can select speech and subtitles (characters) in a given language by preparing a disk on which various types of information in different languages are recorded. The manufacture of disks and reproduction apparatuses can therefore standardized worldwide, which is helpful in reducing manufacturing cost.

Industrial Applicability

As has been described, the present invention can provide a recording medium in which various information items can be recorded and which makes it possible to utilize the information items. The medium can be used in a multimedia system comprising a system for reproducing information from a disk and a system for controlling a memory.

We claim:

1. A multilingual recording medium for use in producing an audiovisual program at a corresponding audiovisual reproduction device when said medium is read by the audiovisual reproduction device, said medium comprising:

a data area including a plurality of data units, each data unit including sub-code information, sub-picture information, video information and audio information, where the sub-code information is positioned within each data unit before the sub-picture information, the video information and the audio information, and where pieces of the audio information are dispersed among multiple audio packets, the audio information including music information related to said video information, audio identification, each of said audio packets being composed of a plurality of frames, each frame having a header containing time information and header data; and a management area including information relating the pieces of audio information dispersed among each of the audio packets to a corresponding code, and control information representing an arrangement of the data area and types of languages corresponding to the audio information in the data area, where the data area and management area are formed in two different portions of the recording medium, and wherein silence is represented by a consecutive arrangement of the headers for two successive frames.

2. A multilingual recording medium according to claim 1, wherein the audio information contains environmental sound information related to the video information.

3. A multilingual recording medium according to claim 1, wherein the audio information further includes at least three pieces of language information related to said video information, and wherein addresses for pieces of comment information corresponding to the at least three pieces of language information are respectively recorded in the management area.

4. A multilingual recording medium according to claim 1, wherein the sub-picture information contains subtitle information and subtitle identification data, where the subtitle information is in at least two languages and related to the video information.

5. A multilingual recording medium according to claim 1, wherein one piece of the audio information is recorded as of a signal which is a combination of environmental sound, music, and first language information.

6. A medium as recited by claim 1, wherein each of the data units is arranged with the sub-code information positioned before the sub-picture information which is positioned before the audio information which is positioned before the video information in a reading direction.

7. A multilingual recording medium for use in producing an audiovisual program at a corresponding audiovisual reproduction device when said medium is read by the audiovisual reproduction device, said medium comprising:

a data area including a plurality of data units, each data unit including sub-code information, sub-picture information, video information and audio information, where pieces of the audio information are dispersed among multiple audio packets, where the audio information includes music information related to said video information and audio identification data, where each of said audio packets is composed of a plurality of frames, each frame having a header containing time information and header data; and a management area recording data string identification information relating each of the pieces of audio information to a corresponding piece of data along with control information representing the data arrangement of the data area and types of languages that correspond to the audio information included in the data area, where the data area and management area are formed in two different portions of the recording medium, wherein silence is represented by a consecutive arrangement of headers for two successive frames.

8. A multilingual recording medium according to claim 7, wherein the sub-picture information includes subtitle information, where the subtitle information is positioned before the audio information in the reading direction.

9. A multilingual recording medium according to claim 6, wherein the audio information further contains environmental sound related to the video information.

10. A multilingual recording medium according to claim 7, wherein the sub-picture information contains subtitle information in at least two languages related to the video information together with subtitle identification data and wherein the management area further contains subtitle data string information corresponding to each language of the subtitle information.

11. A medium as recited by claim 7, wherein each of the data units is arranged with the sub-code information positioned before the sub-picture information which is positioned before the audio information which is positioned before the video information in a reading direction.

12. A multilingual reproducing apparatus for reproducing information from a disk in which a management area is formed in a portion and a data area is formed in another portion, the data area recording a plurality of data units, each data unit containing sub-code information, sub-picture information, video information and audio information, where pieces of the audio information are dispersed among multiple audio packets, the audio information including language information, environmental sound information and music information along with audio identification data, the sub-picture information including subtitle information in at least two languages along with subtitle identification data, where the language information, environmental sound information, music information and subtitle information are related to said video information, and where each of said audio packets is composed of a plurality of frames, each frame having a header containing time information and header data, the management area recording audio data string information, subtitle data string information and control information, the audio data string information relating each of said pieces of audio information to a corresponding audio information language code, the subtitle data string information relating each of multiple pieces of said subtitle information to a corresponding subtitle language code, and the control information representing the data arrangement of said data area and types of languages corresponding to the information in the data area, said apparatus comprising:

pickup means for generating a pickup signal by reading the information from said disk;

demodulation means for obtaining coded video information, coded subtitle information, coded audio information, audio data string information and subtitle data string information by demodulating the pickup signal generated by said pickup means;

management information storage means for storing the audio data string information and the subtitle data string information obtained by said demodulation means;

video information decoding means for generating a video signal by decoding said coded video information obtained by said demodulation means;

subtitle information decoding means for generating a subtitle signal by decoding a piece of the subtitle information obtained by the demodulating means that contains said subtitle identification data corresponding to the subtitle data string information that is specified by subtitle select information, the subtitle signal representing the subtitle information in one language;

synthesizing means for generating a synthesized signal by combining the video signal generated by said video information decoding means with the subtitle signal generated by said subtitle information decoding means, and for supplying the synthesized signal to a video monitor;

first audio information decoding means for generating first audio information by decoding a piece of coded audio information generated by the demodulating means that contains audio identification data corresponding to the audio data string information that is specified by first audio selection information;

second audio information decoding means for generating second audio information by decoding one piece of audio information generated by the demodulation means that contains audio identification data corresponding to the audio data string information that is specified by second audio selection information; and data string control means for generating selection information including the subtitle selection information and the first and second audio selection information for specifying the coded subtitle information and the coded audio information to be decoded based on said subtitle data string information and said audio data string information;

wherein silence is represented by a consecutive arrangement of headers for two successive frames.

13. A multilingual reproduction apparatus according to claim 12, wherein said first audio information is said environmental sound information and music information related to said video information.

14. A multilingual reproduction apparatus according to claim 12, wherein said first audio information is said environmental sound information and music information related said video information and said language information.

15. A multilingual reproduction apparatus according to claim 12, wherein the audio information includes at least three pieces of language information, and wherein said first audio information is said environmental sound information and music information related to said video information and a first of said at least three pieces of language information, and said second audio information is a second of said at least three pieces of language information.

16. A multilingual reproduction apparatus according to claim 12, wherein the audio information includes at least three pieces of language information, and wherein said data string control means contains:

first menu screen display means for displaying a language selection menu on said video monitor in response to a user acknowledge display signal for each language, the language selection menu being displayed based on control information representing the types of said at least three languages for speech and subtitle information stored in said management area; and second menu screen display means for displaying a comment display on said video monitor in the language selected by said selection information when the selection information specifying a language included in the language selection menu has been entered by an operator.

17. A multilingual reproduction apparatus according to claim 16, wherein said second menu screen display means contains means for displaying a speech data string selection display signal and a subtitle data string selection display signal in the language selected by the selection information so that selection of languages for speech and subtitles on said video monitor can be made with reference to a familiar language.

18. A multilingual reproduction apparatus according to claim 12, wherein said subtitle information decoding means decodes the coded subtitle information in a language specified by the subtitle selection information by referring to said subtitle data string information and the subtitle identification data contained in said subtitle information.

19. A multilingual reproduction apparatus according to claim 12, wherein said first and second audio decoding means generate the first and second audio information by referring to said audio data string information, where the audio data string information for each is respectively selected based on said first and second speech select information the audio identification data contained in said audio information.

20. An apparatus as recited by claim 12, wherein each of the data units is arranged with the sub-code information positioned before the sub-picture information which is positioned before the audio information which is positioned before the video information in a reading direction.

21. A multilingual recording medium for use in producing an audiovisual program at a corresponding audiovisual reproduction device when said medium is read by the audiovisual reproduction device, said medium comprising:

a data area recording multiple data units, each data unit containing subcode information, video information, audio information including accompaniment information, and pieces of subtitle information along with subtitle identification data, where the pieces of subtitle information are recorded in at least two languages related to said accompaniment information, where pieces of the audio information are dispersed among multiple audio packets, where each of said audio packets is composed of a plurality of frames, each frame having a header containing time information and header data, and a management area, located in a portion of the disk different from the data area, including information relating pieces of audio information dispersed among each of the audio packets to corresponding codes where the codes identify corresponding pieces of audio information within audio packets in the data area, and control information representing an arrangement of the data area and types of languages corresponding to the audio information in the data area, wherein silence is represented by a consecutive arrangement of headers for two successive frames.

22. A medium as recited by claim 21, wherein each of the data units is arranged with the sub-code information positioned before the sub-picture information which is positioned before the audio information which is positioned before the video information in a reading direction.

23. A multilingual recording medium for use in producing an audiovisual program at a corresponding audiovisual reproduction device when said medium is read by the audiovisual reproduction device, said medium comprising:

a data area recording multiple data units, each data unit containing subcode information, subpicture information, video information, first audio information related to accompaniment information, and second audio information obtained by combining said language information and accompaniment information, where each of said audio packets is composed of a plurality of frames, each frame having a header containing time information and header data, and a management area, located in a portion of the disk different from the data area, including information relating the pieces of the first and second audio information dispersed among the audio packets to corresponding codes, and control information representing an arrangement of the data area and types of languages corresponding to the first and second audio information in the data area, where the codes identify corresponding pieces of audio information within audio packets in the data area, and wherein silence is represented by a consecutive arrangement of headers for two successive frames.

24. A medium as recited by claim 23, wherein each data unit is arranged with the sub-code information positioned before the sub-picture information which is positioned before the first and second audio information which are positioned before the video information in a reading direction.

25. A multilingual recording medium for use in producing an audiovisual program at a corresponding audiovisual reproduction device when said medium is read by the audiovisual reproduction device, said medium comprising:

a data area recording multiple data units, each data unit containing subcode information, subpicture information, video information, first audio information based on at least one piece of instrument information and second audio information obtained by combining multiple pieces of instrument information including the at least one piece of instrument information corresponding to the first audio information, where each of said audio packets is composed of a plurality of frames, each frame having a header containing time information and header data, and a management area, located in a portion of the disk different from the data area, including information relating the pieces of the first and second audio information dispersed among the audio packets to corresponding codes, and control information representing an arrangement of the data area and types of languages corresponding to the first and second audio information in the data area, where the codes identify corresponding pieces of audio information within audio packets in the data area, and wherein silence is represented by a consecutive arrangement of headers for two successive frames.

26. A medium as recited by claim 25, wherein each data unit is arranged with the sub-code information positioned before the sub-picture information which is positioned before the first and second audio information which are positioned before the video information in a reading direction.

27. A multilingual reproduction apparatus for reproducing information from a disk in which a management area is formed in a portion and a data area is formed in another portion, the data area recording a plurality of data units, each data unit containing subcode information, video information, audio information including accompaniment information, and subtitle information pieces including at least two languages related to said accompaniment information along with subtitle identification data, where pieces of the audio information are dispersed among multiple audio packets, and where each of said audio packets is composed of a plurality of frames, each frame having a header containing time information and header data, the management area recording subtitle data string information corresponding to each of said pieces of subtitle information along with control information representing the data arrangement of said data area and types of languages corresponding to data recorded in the data area, said apparatus comprising:

pickup means for generating a pickup signal by reading the information from said disk;

demodulation means for obtaining coded video information, coded subtitle information, coded accompaniment information and subtitle data string information by demodulating the pickup signal generated by said pickup means;

management information storage means for storing the subtitle data string information obtained by said demodulation means;

video information decoding means for generating a video signal by decoding said coded video information obtained by said demodulation means;

subtitle information decoding means for generating a subtitle signal by decoding a portion of the coded subtitle information obtained by the demodulating means which contains said subtitle identification data corresponding to the subtitle data string information that is specified by subtitle select information, the subtitle signal representing the subtitle information in one language;

synthesizing means for generating a synthesized signal by combining the video signal generated by said video information decoding means with the subtitle signal generated by said subtitle information decoding means, and for supplying the synthesized signal to a video monitor;

accompaniment information decoding means for decoding the coded accompaniment information generated by said demodulation means; and data string control means for selecting and supplying the pieces of coded subtitle information to be decoded by said subtitle information decoding means based on subtitle select information and the subtitle data string information, wherein silence is represented by a consecutive arrangement of headers for two successive frames.

28. A multilingual reproduction apparatus according to claim 27, wherein said data string control means contains:

first menu screen display means for displaying a language selection menu on said video monitor in response to a user acknowledge display signal for each language based on control information representing the types of at least two languages of the subtitle information stored in said management area; and means for automatically selecting said subtitle data string information corresponding to said subtitle select information when a piece of language select information is entered from an operator section.

29. An apparatus as recited by claim 27, wherein each of the data units is arranged with the sub-code information positioned before the sub-picture information which is positioned before the audio information which is positioned before the video information in a reading direction.

30. A multilingual reproduction apparatus for reproducing information from a disk in which a management area is formed in a portion and a data area is formed in another portion, the data area recording a plurality of data units, each data unit containing sub-code information, video information, accompaniment information, audio information and subtitle information, where pieces of the audio information are dispersed among multiple audio packets, the subtitle information including pieces in at least two languages related to said accompaniment information along with subtitle identification data, where each of said audio packets is composed of a plurality of frames, each frame having a header containing time information and header data, the management area recording audio data string information representing each data piece of said audio information, subtitle data string information corresponding to each of said pieces of subtitle information, and control information representing the data arrangement of said data area and types of languages corresponding to data recorded in the data area, said apparatus comprising:

pickup means for generating a pickup signal by reading the information from said disk;

demodulation means for obtaining coded video information, coded subtitle information, coded accompaniment information, audio data string information and subtitle data string information by demodulating the pickup signal generated by said pickup means;

management information storage means for storing said audio data string information and the subtitle data string information obtained by said demodulation means;

video information decoding means for generating a video signal by decoding said coded video information obtained by said demodulation means;

subtitle information decoding means for generating a subtitle signal by decoding a portion of the coded subtitle information obtained by the demodulating means which contains said subtitle identification data corresponding to the subtitle data string information that is specified by subtitle select information, the subtitle signal representing the subtitle information in one language;

synthesizing means for generating a synthesized signal by combining the video signal generated by said video information decoding means with the subtitle signal generated by said subtitle information decoding means, and for supplying the synthesized signal to a video monitor;

first audio information decoding means for decoding a piece of said coded accompaniment information corresponding to the audio data string information that is specified by first audio selection information;

second audio information decoding means for decoding a piece of said language information corresponding to the audio data string information that is specified by second audio selection information; and data string control means for generating selection information including the subtitle selection information and the first and second audio selection information for specifying the portion of the coded subtitle information, the coded accompaniment information and the coded language information to be decoded based on said subtitle data string information and said audio data string information, wherein silence is represented by a consecutive arrangement of headers for two successive frames.

31. A multilingual reproduction apparatus recording to claim 30, wherein said data string control means contains:

first menu screen display means for displaying a language selection menu on said video monitor in response to a user acknowledge display signal, the language selection menu being displayed based on control information representing types of languages stored in said management area of the disk; and means for automatically generating said subtitle select information and said second audio select information when a piece of language selection information is entered from an operator section.

32. An apparatus as recited by claim 30, wherein each of the data units is arranged with the sub-code information positioned before the sub-picture information which is positioned before the audio information which is positioned before the video information in a reading direction.

33. A multilingual recording medium for use in producing an audiovisual program at a corresponding audiovisual reproduction device when said medium is read by the audiovisual reproduction device, said medium comprising:

a data area recording a plurality of data units where each data unit contains subcode information, subimage information, audio information, and video information arranged with the subcode information before the subimage information which is before the audio information which is before the video information in a reading direction, and where pieces of the audio information are dispersed among multiple audio packets, and a management area, located in a portion of the disk different from the data area, including information relating the pieces of audio information dispersed among the audio packets to corresponding codes, and control information representing an arrangement of the data area and types of languages corresponding to the audio information in the data area, where the codes identify corresponding pieces of audio information within audio packets in the data area, wherein each of the audio packets is composed of a plurality of frames, each frame having a header containing time information and header data, and wherein silence is represented by two consecutive headers in the frames.

34. A multilingual recording medium for use in producing an audiovisual program at a corresponding audiovisual reproduction device when said medium is read by the audiovisual reproduction device, said medium comprising:

a data area including a plurality of data units, each data unit including sub-code information, sub-picture information, video information and audio information, where the sub-code information is positioned within each data unit before the sub-picture information, the video information and the audio information, and where pieces of the audio information are dispersed among multiple audio packets, the audio information including audio identification and language information related to said video information, each of said audio packets being composed of a plurality of frames, each frame having a header containing time information and header data; and a management area including information relating the pieces of audio information dispersed among each of the audio packets to a corresponding code, and control information representing an arrangement of the data area and types of languages corresponding to the audio information in the data area, where the data area and management area are formed in two different portions of the recording medium, wherein silence is represented by a consecutive arrangement of headers for two successive frames.

35. A multilingual recording medium for use in producing an audiovisual program at a corresponding audiovisual reproduction device when said medium is read by the audiovisual reproduction device, said medium comprising:

a data area including a plurality of data units, each data unit including sub-code information, sub-picture information and audio information, where the sub-code information is positioned within each data unit before the sub-picture information and the audio information, and where pieces of the audio information are dispersed among multiple audio packets, the audio information including music information related to said video information, audio identification and language information related to said video information, each of said audio packets being composed of a plurality of frames, each frame having a header containing time information and header data; and a management area including information relating the pieces of audio information dispersed among each of the audio packets to a corresponding code, and control information representing an arrangement of the data area and types of languages corresponding to the audio information in the data area, where the data area and management area are formed in two different portions of the recording medium, wherein silence is represented by a consecutive arrangement of headers for two successive frames.

36. A multilingual recording medium for use in producing an audiovisual program at a corresponding audiovisual reproduction device when said medium is read by the audiovisual reproduction device, said medium comprising:

a data area including a plurality of data units, each data unit including sub-code information, sub-picture information, video information and audio information, where the sub-code information is positioned within each data unit before the sub-picture information, the video information and the audio information, and where pieces of the audio information are dispersed among multiple audio packets, the audio information including music information related to said video information, audio identification and plural pieces of language information related to said video information, each of said audio packets being composed of a plurality of frames, each frame having a header containing time information and header data; and a management area including information relating the pieces of audio information dispersed among each of the audio packets to a corresponding code, and control information representing an arrangement of the data area and types of languages corresponding to the audio information in the data area, where the data area and management area are formed in two different portions of the recording medium, wherein silence is represented by a consecutive arrangement of headers for two successive frames.

37. A multilingual reproduction apparatus for reproducing information from a disk in which a management area is formed in a portion and a data area is formed in another portion, the data area recording a plurality of data units, each data unit containing subcode information, subtitle information video information and audio information, where pieces of the audio information are dispersed among multiple audio packets, the audio information including plural pieces of language information related to the video information along with audio identification data, the subtitle information including pieces in plural languages that are related to said video information along with subtitle identification data, the management area recording audio data string information corresponding to each of said pieces of audio information and subtitle data string information corresponding to each piece of said subtitle information along with control information representing the data arrangement of said data area and types of languages corresponding to data recorded in the data area, said apparatus comprising:

pickup means for generating a pickup signal by reading the information from said disk;

demodulation means for obtaining coded video information, coded subtitle information, coded audio information, audio data string information and subtitle data string information by demodulating the pickup signal generated by said pickup means;

management information storage means for storing the audio data string information and the subtitle data string information obtained by said demodulation means;

video information decoding means for generating a video signal by decoding said coded video information obtained by said demodulation means;

subtitle information decoding means for generating a subtitle signal by decoding a piece of the coded subtitle information obtained by the demodulating means which contains said subtitle identification data corresponding to the subtitle data string information that is specified by subtitle select information, the subtitle signal representing the subtitle information in one language;

synthesizing means for generating a synthesized signal by combining the video signal generated by said video information decoding means with the subtitle signal generated by said subtitle information decoding means, and for supplying the synthesized signal to a video monitor;

first audio information decoding means for generating first audio information by decoding a piece of the coded audio information generated by the demodulating means that contains audio identification data corresponding to the audio data string information that is specified by first audio selection information;

second audio information decoding means for generating second audio information by decoding a piece of the audio information generated by the demodulation means that contains audio identification data corresponding to the audio data string information that is specified by second audio selection information;

selection information input means for entering the subtitle selection information and the first and second audio selection information, the subtitle select information being used to determine which piece of the coded subtitle information will be decoded by specifying the subtitle data string information for the subtitle information decoding means, the first and second audio select information being used to determine which of the coded pieces of audio information will be decoded by specifying the audio data string information for the first and second audio decoding means, respectively;

frequency storage means for storing frequency information based on a frequency corresponding to input of said subtitle selection information and first and second audio selection information from said selection information input means; and means for automatically determining said subtitle selection information and said first and second audio selection information without an entry from the selection information input means when said subtitle data string information and said audio data string information are respectively supplied to said subtitle information decoding means, said first audio information decoding means and said second audio decoding means, and when said frequency information stored in said frequency storage means is equal to or larger than a specified value, wherein silence is represented by a consecutive arrangement of headers for two successive frames.

* * * * *

UNITED STATES PATENT AND TRADEMARK OFFICE
CERTIFICATE OF CORRECTION

PATENT NO.     : 5,835,670
DATED          : November 10, 1998
INVENTOR(S)    : HIRAYAMA et al.

It is certified that error appears in the above-identified patent and that said Letters Patent is hereby corrected as shown below:

ON THE COVER PAGE

Please add:  --[30]   Foreign Application Priority Data

Oct. 29, 1993   [JP]   Japan   PCT JP93/01571.

[75]   4th Inventor   should be --Kenjiro Endoh--.

Signed and Sealed this

Fifteenth Day of June, 1999

Attest:

Q. TODD DICKINSON

Attesting Officer

Acting Commissioner of Patents and Trademarks